US012297669B2

(12) United States Patent
Tomaszewski

(10) Patent No.: US 12,297,669 B2
(45) Date of Patent: May 13, 2025

(54) CLOSURE LATCH ASSEMBLY WITH POWER-OPERATED ACTUATOR PROVIDING MULTIPLE POWERED FUNCTIONS

(71) Applicant: MAGNA CLOSURES INC., Newmarket (CA)

(72) Inventor: Kris Tomaszewski, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 251 days.

(21) Appl. No.: 17/988,751

(22) Filed: Nov. 16, 2022

(65) Prior Publication Data

US 2023/0167660 A1 Jun. 1, 2023

Related U.S. Application Data

(60) Provisional application No. 63/283,826, filed on Nov. 29, 2021, provisional application No. 63/298,409, filed on Jan. 11, 2022, provisional application No. 63/342,806, filed on May 17, 2022.

(51) Int. Cl.

| | |
|---|---|
| ***E05B 81/14*** | (2014.01) |
| ***E05B 77/26*** | (2014.01) |
| ***E05B 81/06*** | (2014.01) |
| ***E05B 81/30*** | (2014.01) |
| ***E05B 81/34*** | (2014.01) |
| ***E05B 81/42*** | (2014.01) |

(52) U.S. Cl.

CPC .............. *E05B 81/14* (2013.01); *E05B 77/26* (2013.01); *E05B 81/06* (2013.01); *E05B 81/30* (2013.01); *E05B 81/34* (2013.01); *E05B 81/42* (2013.01)

(58) Field of Classification Search

CPC .......... E05B 81/06; E05B 81/14; E05B 81/30; E05B 81/34; E05B 81/42; E05B 77/26; Y10T 70/7102

USPC .......................................................... 70/278.7

See application file for complete search history.

(56) References Cited

U.S. PATENT DOCUMENTS

| | | | | |
|---|---|---|---|---|
| 6,003,910 | A | 12/1999 | Dupont et al. | |
| 6,764,113 | B1 | 7/2004 | Cetnar | |
| 7,827,836 | B2 * | 11/2010 | Cetnar | E05B 81/16 292/201 |
| 10,450,780 | B2 | 10/2019 | Tomaszewski | |
| 11,072,950 | B2 | 7/2021 | Taurasi | |
| 11,280,121 | B2 | 3/2022 | Sardelli et al. | |
| 2004/0174021 | A1 | 9/2004 | Tensing et al. | |
| 2007/0210588 | A1 | 9/2007 | Cetnar | |
| 2010/0244466 | A1 | 9/2010 | Tomaszewski | |
| 2016/0017645 | A1 | 1/2016 | Tomaszewski et al. | |
| 2017/0314297 | A1 | 11/2017 | Taurasi et al. | |

(Continued)

FOREIGN PATENT DOCUMENTS

| | | | | |
|---|---|---|---|---|
| EP | 1212501 B1 | | 6/2002 | |
| WO | WO-2006015481 A1 | * | 2/2006 | E05B 77/26 |
| WO | WO-2009030046 A1 | * | 3/2009 | E05B 77/26 |

(Continued)

*Primary Examiner* — Suzanne L Barrett

(74) *Attorney, Agent, or Firm* — Dickinson Wright PLLC

(57) ABSTRACT

A power latch assembly for motor vehicle closure applications has a single motor operable to move a pawl from a ratchet holding position to a ratchet releasing position and place the power latch assembly in at least one of a lock state and a child lock state.

20 Claims, 13 Drawing Sheets

(56) References Cited

U.S. PATENT DOCUMENTS

| | | | | |
|---|---|---|---|---|
| 2022/0298835 A1* | 9/2022 | Taurasi | .................... | E05B 77/26 |

FOREIGN PATENT DOCUMENTS

| | | | |
|---|---|---|---|
| WO | 2012052533 | A1 | 4/2012 |
| WO | 2013170363 | A1 | 11/2013 |

* cited by examiner

CLOSURE LATCH ASSEMBLY WITH POWER-OPERATED ACTUATOR PROVIDING MULTIPLE POWERED FUNCTIONS

CROSS-REFERENCE TO RELATED APPLICATIONS

This application claims the benefit of U.S. Provisional Application Ser. No. 63/342,806, filed May 17, 2022, of U.S. Provisional Application Ser. No. 63/298,409, filed Jan. 11, 2022, and of U.S. Provisional Application Ser. No. 63/283,826, filed Nov. 29, 2021, which are all incorporated herein by reference in their entirety.

FIELD

The present disclosure relates generally to automotive door latches, and more particularly, to a power door latch assembly equipped with a single power motor driving multiple functions, including power release, lock, and child lock.

BACKGROUND

This section provides background information related to automotive door latches and is not necessarily prior art to the concepts associated with the present disclosure.

A vehicle closure panel, such as a side door for a vehicle passenger compartment, is hinged to swing between open and closed positions and includes a latch assembly mounted to the door. The latch assembly functions in a well-known manner to latch the door when it is closed and unlatch and release the door to permit subsequent movement of the door to its open position. As is also well known, the latch assembly includes a latch mechanism for latching the door and a release mechanism for unlatching the door. The release mechanism can be power-operated to unlatch the door.

During powered actuation of latch mechanism, it is known to actuate a first gear mechanism with a first motor to move a pawl from a ratchet holding position to a ratchet releasing position, thereby allowing a ratchet to move from a striker capture position to a striker releasing position, whereat the door can be moved from a closed position to an open position.

Additionally, it is known to provide a secondary motor in addition to the first motor, with the secondary motor being used to, by way of example, move a lock mechanism to a mechanical double pull/double lock and/or a child lock position. Although such secondary motors can prove useful, they come at an increase in cost, increase in complexity of manufacture, assembly and operation, increase in power demand, and increase in total package size (envelop) of the latch assembly, thereby requiring an increase in space within the vehicle closure panel, and thus, limiting the design option of the vehicle closure panel.

Thus, there remains a need to develop alternative arrangements for latch mechanisms for use in vehicular door latches which optimize the ability to perform multiple functions without having to provide multiple motors to accomplish the desired functions.

SUMMARY

This section provides a general summary of the disclosure, and is not intended to be a comprehensive and exhaustive listing of all of its features or its full scope.

It is an object of the present disclosure to provide a power latch assembly for motor vehicle closure applications that overcomes at least those drawbacks discussed above associated with known power latch assemblies.

It is another object of the present disclosure to provide a power latch assembly for motor vehicle closure applications that has a single motor that is optimized to have a minimal size, while having sufficient power to perform multiple powered functions.

It is another object of the present disclosure to provide a power latch assembly for motor vehicle closure applications that has a single motor capable of at least two or more functions, including: a power release function moving a pawl from a ratchet holding position to a ratchet releasing position; placing the power latch assembly in a double pull mechanical release state, and placing the power latch assembly in a child lock state.

In accordance with these and other objects, features and advantages, a power latch assembly for a closure panel includes: a ratchet, configured for movement between a striker capture position and a striker release position and being biased toward the striker release position, and a pawl, configured for movement between a ratchet holding position, whereat the pawl maintains the ratchet in the striker capture position, and a ratchet releasing position, whereat the pawl releases the ratchet for movement of the ratchet to the striker release position. A power actuator is configured to move the power latch assembly from an unlock state to an open state, whereat the pawl moves from the ratchet holding position to the ratchet releasing position. The power actuator is further configured to perform at least two of the following: place the power latch assembly in a child lock state, whereat the pawl is prevented from moving from the ratchet holding position to the ratchet releasing position regardless of the number of actuations of an inside release mechanism; release the power latch assembly from the child lock state; and place the power latch assembly in a lock state, whereat the pawl is prevented from moving from the ratchet holding position to the ratchet releasing position during a first mechanical actuation of the inside release mechanism.

In accordance with another aspect of the disclosure, a power release gear is configured in operable communication with the power actuator. The power actuator is configured to move the power release gear from a home position, whereat the power latch assembly is in the unlock state, in a first direction to a release position, whereat the power latch assembly is in the open state, and to drive the power release gear from the home position in a second direction to a place the power latch assembly in at least one of the child lock state and the lock state.

In accordance with another aspect of the disclosure, the power actuator is configured to move the power release gear from the home position in the second direction to place the power latch assembly the child lock state and the lock state, at separate times.

In accordance with another aspect of the disclosure, the power actuator is configured to move the power release gear in the first direction to move the power latch assembly from the child lock state to at least one of the lock state and the unlock state.

In accordance with another aspect of the disclosure, the power actuator is configured to move the power release gear from the child lock state, during a first actuation of the power actuator, in the first direction to move the power latch assembly to the lock state, and to move the power release gear from the lock state, during a second actuation of the power actuator, in the first direction to move the power latch assembly from the lock state to the unlock state.

In accordance with another aspect of the disclosure, the power release gear includes a first cam configured to move the pawl from the ratchet holding position to the ratchet releasing position when the power release gear moves in the first direction from the home position to the release position, and a second cam configured to place the power latch assembly in at least one of the lock state and the child lock state when the power release gear is driven from the home position in the second direction.

In accordance with another aspect of the disclosure, the first cam and the second cam are on opposite sides of the power release gear, thereby reducing the complexity of design of the power latch assembly and the reducing the overall size of the latch assembly.

In accordance with another aspect of the disclosure, the second cam is configured to place the power latch assembly in the lock state and the child lock state, at separate times, thereby reducing the complexity of design of the power latch assembly and the reducing the overall size of the latch assembly.

In accordance with another aspect of the disclosure, the power latch assembly includes an inside release lever and a link coupled to one another via a pivot connection. The inside release lever is configured for movement from an inside release lever rest position to an inside release lever deployed position in response to mechanical actuation of an inside release mechanism, whereupon, when the power release gear is in the home position, the link moves the power latch assembly from the unlock state to the open state.

In accordance with another aspect of the disclosure, the power latch assembly includes a pawl release lever configured for operable communication with the pawl to move the pawl from the ratchet holding position to the ratchet releasing position when the pawl release lever is moved from a pawl release lever rest position to a pawl release lever deployed position. The link is configured to move the pawl release lever from the pawl release lever rest position to the pawl release lever deployed position when the inside release lever is moved from the inside release lever rest position to the inside release lever deployed position in response to mechanical actuation of the inside release mechanism.

In accordance with another aspect of the disclosure, the link is prevented from being able to move the pawl release lever from the pawl release lever rest position to the pawl release lever deployed position when the power latch assembly is in the child lock state.

In accordance with another aspect of the disclosure, the power release gear includes a third cam. The link, while the power latch assembly is in the lock state, is configured to engage the third cam during movement of the inside release lever from the inside release lever rest position to the inside release lever deployed position in response to a first mechanical actuation of the inside release mechanism, whereupon the power release gear is moved to the home position, whereat the power latch assembly is in the unlock state, such that a second mechanical actuation of the inside release mechanism causes the pawl release lever to move from the pawl release lever rest position to the pawl release lever deployed position, whereupon the power latch assembly moves from the unlock state to the open state.

In accordance with another aspect of the disclosure, the link has a first abutment surface and a second abutment surface. The first abutment surface is configured to engage the third cam during movement of the inside release lever from the inside release lever rest position to the inside release lever deployed position while the power latch assembly is in the lock position, and the second abutment surface is configured to engage the pawl release lever to move from the pawl release lever rest position to the pawl release lever deployed position while the power latch assembly is in the unlock position.

In accordance with another aspect of the disclosure, a power release gear is configured in operable communication with the single power actuator, wherein the single power actuator is configured to drive the power release gear from a home position to a release position, whereupon the power release gear operably drives the pawl from the ratchet holding position to the ratchet releasing position, and from the home position to a lock position, whereupon the power release gear operably places the power latch assembly in one of the double pull lock state and the child lock state.

In accordance with another aspect of the disclosure, a first cam is driven by power release gear to move the pawl from the ratchet holding position to the ratchet releasing position when the power release gear is driven from the home position to the release position, and a second cam is driven by power release gear when the power release gear is driven from the home position to the lock position to place the power latch assembly in one of the double pull lock state and the child lock state.

In accordance with another aspect of the disclosure, the first abutment surface is between the second abutment surface and the pivot connection of the inside release lever and the link.

In accordance with another aspect of the disclosure, the pawl release lever can be provided having a first leg configured for engagement with the first cam and a second leg configured for engagement with the link.

In accordance with another aspect of the disclosure, a power release gear can be configured in operable communication with the power actuator, with the power actuator being configured to move the power release gear from a home position, whereat the power latch assembly is in the unlock state, in a first direction to a release position, whereat the power latch assembly is in the open state, and to drive the power release gear from the home position in a second direction to a place the power latch assembly in the child lock state and the lock state, whereat the power release gear is in the same position while in the child lock state and the lock state.

In accordance with another aspect of the disclosure, an inside release lever and a link can be coupled to one another via a pivot connection, with the inside release lever being configured for movement from an inside release lever rest position to an inside release lever deployed position in response to mechanical actuation of an inside release mechanism, whereupon, when the power release gear is in the home position, the link moves the power latch assembly from the unlock state to the open state in response to the inside release lever being moved from the inside release lever rest position to the inside release lever deployed position, and when the power release gear is in the lock position, the link moves the power release gear from the lock position to the home position, whereat the power latch assembly is in the unlock state, in response to the inside release lever being moved from the inside release lever rest position to the inside release lever deployed position in a first pull, and moves the power latch assembly from the unlock state to the open state in response to the inside release lever being moved from the inside release lever rest position to the inside release lever deployed position in a second pull, and when the power release gear is in the child lock position, the link moves the power release gear from the child lock position to the home position in response to the inside release lever being moved from the inside release lever rest position to the inside release lever deployed position, whereupon the power actuator drives the power release gear back from the home position in the second direction to the child lock position.

In accordance with another aspect of the disclosure, at least one sensor can be configured in operable communication with a latch ECU to detect when to actuate the power actuator to drive the power release gear back from the home position in the second direction to the child lock position.

In accordance with another aspect of the disclosure, a ring magnet can be fixed on an output shaft of the power actuator, wherein the at least one sensor is configured to detect when the power release gear moves from the child lock position to the home position upon the inside release lever being moved from the inside release lever rest position to the inside release lever deployed position.

In accordance with another aspect of the disclosure, the at least one sensor can be configured to detect when the inside release lever returns from the inside release lever deployed position toward the inside release lever rest position, whereupon the latch ECU actuates the power actuator to drive the power release gear back from the home position in the second direction to the child lock position.

In accordance with another aspect of the disclosure, a method of configuring a power latch assembly to perform multiple functions with a single power actuator is provided, wherein the power latch assembly has a ratchet configured for movement between a striker capture position and a striker release position, with the ratchet being biased toward the striker release position, and a pawl configured for movement between a ratchet holding position, whereat the pawl maintains the ratchet in the striker capture position, and a ratchet releasing position, whereat the pawl releases the ratchet for movement of the ratchet to the striker release position, is provided. The method includes, configuring the single power actuator to move the pawl from the ratchet holding position to the ratchet releasing position when the power latch assembly is in a latch closed, unlock state. Further, configuring the single power actuator to selectively place the power latch assembly in a lock state, whereat upon completion of a first and second mechanical actuation of an inside release mechanism, the pawl is moved from the ratchet holding position to the ratchet releasing position. Further yet, configuring the single power actuator to place the power latch assembly in a child lock state, whereat repeated mechanical actuation of the inside release mechanism fails to move the pawl from the ratchet holding position to the ratchet releasing position.

In accordance with another aspect of the disclosure, the method includes configuring the single power actuator to drive a power release gear having a first cam configured to move the pawl from the ratchet holding position to the ratchet releasing position when the power release gear is driven from the home position in a first direction to the release position, and configuring the single power actuator to drive the power release gear having a second cam configured to place the power latch assembly in one of the lock state and the child lock state when the power release gear is driven from the home position in a second direction opposite the first direction.

In accordance with another aspect of the disclosure, the method includes configuring the power release gear to be driven in the first direction to move the power latch assembly from the child lock state to at least one of the lock state and the unlock state.

In accordance with another aspect of the disclosure, the method further includes coupling an inside release lever and a link to one another via a pivot connection and configuring the inside release lever for movement from an inside release lever rest position to an inside release lever deployed position in response to mechanical actuation of an inside release mechanism, whereupon, when the power release gear is in the home position, the link moves the power latch assembly from the unlock state to the open state.

In accordance with another aspect of the disclosure, the method further includes configuring a pawl release lever for operable communication with the pawl to move the pawl from the ratchet holding position to the ratchet releasing position when the pawl release lever is moved from a pawl release lever rest position to a pawl release lever deployed position, and configuring the link to move the pawl release lever from the pawl release lever rest position to the pawl release lever deployed position when the inside release lever is moved from the inside release lever rest position to the inside release lever deployed position in response to mechanical actuation of the inside release mechanism.

In accordance with another aspect of the disclosure, the method further includes configuring the power release gear having a third cam, and configuring the link, while the power latch assembly is in the lock state, to engage the third cam during movement of the inside release lever from the inside release lever rest position to the inside release lever deployed position in response to a first mechanical actuation of the inside release mechanism to move the power release gear to the home position, whereat the power latch assembly is in the unlock state, such that a second mechanical actuation of the inside release mechanism causes the pawl release lever to move from the pawl release lever rest position to the pawl release lever deployed position, whereat the power release assembly moves from the unlock state to the open state.

In accordance with another aspect of the disclosure, a method of controlling a power latch assembly having a child lock state and a lock state, includes: detecting movement of a power release gear from a child lock/lock position, whereat the power latch assembly is in one of the child lock state or the lock state, to a home position in response to a first pull of an inside handle. Further, immediately actuating a power actuator upon the power release gear being moved to the home position to return the power release gear to the child lock/lock position, whereat the power latch assembly is prevented from being unlatched in response to a single pull of an inside release lever.

In accordance with another aspect of the disclosure, the method of controlling a power latch assembly having a child lock state and a lock state can further include, detecting the power release gear being moved to the home position with a first sensor configured to detect movement of a magnet ring on an output shaft of the power actuator.

In accordance with another aspect of the disclosure, the method of controlling a power latch assembly having a child lock state and a lock state can further include, causing the power actuator to be immediately actuated to return the power release gear to the child lock/lock position in response to detecting movement of the inside release lever from a deployed position toward a non-deployed, rest position.

In accordance with another aspect of the disclosure, the method of controlling a power latch assembly having a child lock state and a lock state can further include, causing the power actuator to be immediately actuated to return the power release gear to the child lock/lock position in response to detecting movement of the power release gear to the home position.

In accordance with another aspect of the disclosure, the method of controlling a power latch assembly having a child lock state and a lock state can further include, providing a control unit to receive instructions on whether the child lock/lock position is operating in the child lock state or the lock state.

In accordance with another aspect of the disclosure, the method of controlling a power latch assembly having a child lock state and a lock state can further include, detecting the power latch assembly being in the lock state, whereat the control unit does not actuate the power actuator to return the power release gear to the child lock/lock position upon the power release gear being moved to the home position.

In accordance with further aspects, a power latch assembly for a closure panel includes a ratchet configured for movement between a striker capture position and a striker release position and being biased toward said striker release position, a pawl configured for movement between a ratchet holding position, whereat the pawl maintains the ratchet in the striker capture position, and a ratchet releasing position, whereat the pawl releases the ratchet for movement of the ratchet to the striker release position, a manual release mechanism configured for mechanical actuation by a door handle, the manual release mechanism having an unlocked state to couple the handle to the pawl allowing the pawl to be moved to the ratchet releasing position by the handle and a locked state to decouple the handle from the pawl to prevent the pawl from being moved to the ratchet releasing position by the handle, wherein the manual release mechanism is adapted to change state from the locked state to the unlock state in response to a first actuation of the handle and to allow the pawl to be moved to the ratchet releasing position in response to a second handle actuation, and a power release actuator system configured to control powered actuation of the pawl to move the pawl from the ratchet holding position to the ratchet releasing position and to control the manual release mechanism to automatically place the manual release mechanism in the locked state subsequent to the first handle actuation.

In accordance with another aspect, there is provided a power latch assembly for a closure panel including a ratchet, a pawl, a double pull manual release chain configured to move the pawl in response to two manual actuations of the double pull manual release chain in a double pull OFF state and prevent movement of the pawl in response to a first manual actuation of the double pull manual release chain in a double pull ON state, wherein a locked state of the power latch assembly is provided by automatically resetting the manual release chain from the double pull OFF state to the double pull ON state in response to the first manual actuation.

In a related aspect, there is a power latch assembly for a closure panel, the power latch assembly operably coupled to a handle, the power latch assembly including a ratchet configured for movement between a striker capture position and a striker release position and being biased toward said striker release position, a pawl configured for movement between a ratchet holding position, whereat said pawl maintains said ratchet in said striker capture position, and a ratchet releasing position, whereat said pawl releases said ratchet for movement of said ratchet to said striker release position, a double pull mechanism having a double pull on state and a double pull off state, wherein a first actuation of the handle with the double pull mechanism in the double pull on state transitions the double pull mechanism from the double pull on state to the double pull off state and prevents the handle from moving the pawl, and a second actuation of the handle with the double pull mechanism in the double pull OFF state causes the pawl to be moved to the ratchet releasing position; and a motor adapted to transition the double pull mechanism from the double pull off state to the double pull on state subsequent the first actuation. In a related aspect, the motor adapted to transition the double pull mechanism from the double pull off state to the double pull on state before the second actuation.

Further areas of applicability and functionality of the power latch assembly and single motor thereof will become apparent from the description provided herein. The description and specific examples in this summary are intended for purposes of illustration only and are not intended to limit the scope of the present disclosure.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings wherein.

Corresponding reference numerals are used throughout all of the drawings to indicate corresponding parts.

DETAILED DESCRIPTION OF EXAMPLE EMBODIMENTS

Figure 1:
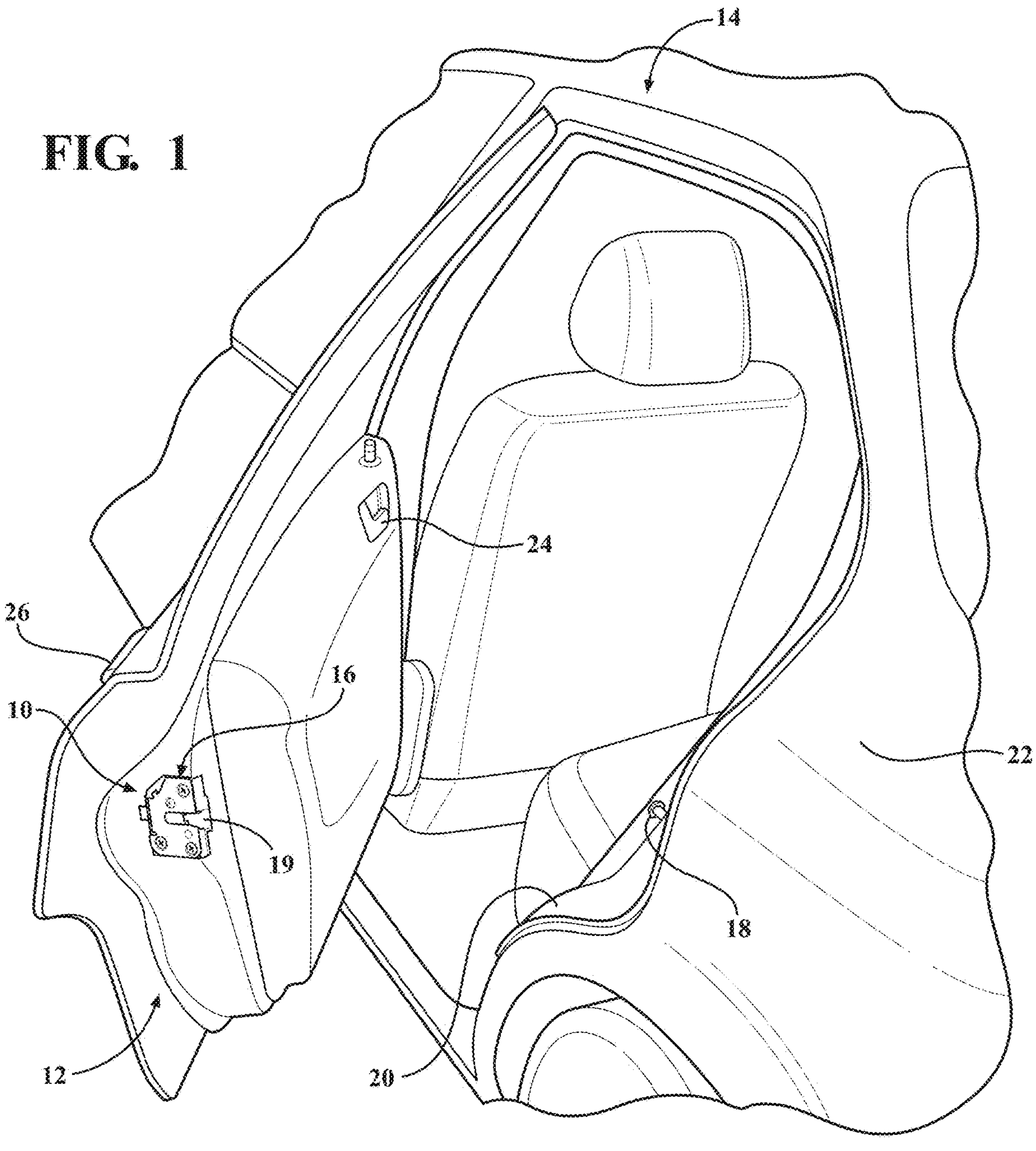
FIG. 1 is a partial perspective view of a motor vehicle having a side door equipped with a power latch assembly embodying the teachings of the present disclosure.

One or more example embodiments of a powered latch assembly of the type well-suited for use in motor vehicle closure systems will now be described with reference to the accompany drawings. However, these example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by a skilled artisan.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1, a non-limiting example of a power latch assembly is shown, referred to hereafter simply as latch assembly 10, installed in a closure panel, such as, by way of example and without limitation, a door, shown as a passenger side swing door, and more particularly a rear passenger side swing door 12 of a motor vehicle 14. Latch assembly 10 includes a latch mechanism 16 configured to releasably latch and hold a striker 18 mounted to a sill portion 20 of a vehicle body 22 when swing door 12 is closed. Latch assembly 10 can be selectively actuated via mechanical actuation of an inside release mechanism, such as an inside door handle 24, an outside door handle 26, and a key fob 28 (FIG. 2A). Inside door handle 24 and an outside door handle 26, examples of a manual handle may include an unactuated position while at rest, such as for example as defined by a bias (e.g. spring) and an actuated position when manually acted upon by a user against such a bias for a non-motorized operation of the power latch assembly 10. For example, the bias results in the handle returning from the actuated position to the non-actuated position when the user releases the handle after an actuation. Such a bias may be provided as part of a handle assembly, the latch assembly 10 or both, as but non-limiting examples. As detailed hereafter, latch assembly 10 is configured to be power-operated to perform multiple powered functions via selective actuation of a single power release actuator, also referred to as power actuator, such as an electric motor 30. By multiple functions being powered via the single power release actuator 30, the latch assembly 10 is able to be minimized in size and weight, thereby enhancing the flexibility of design of the closure panel, while also reducing the cost associated manufacture and assembly thereof.

Figure 2:
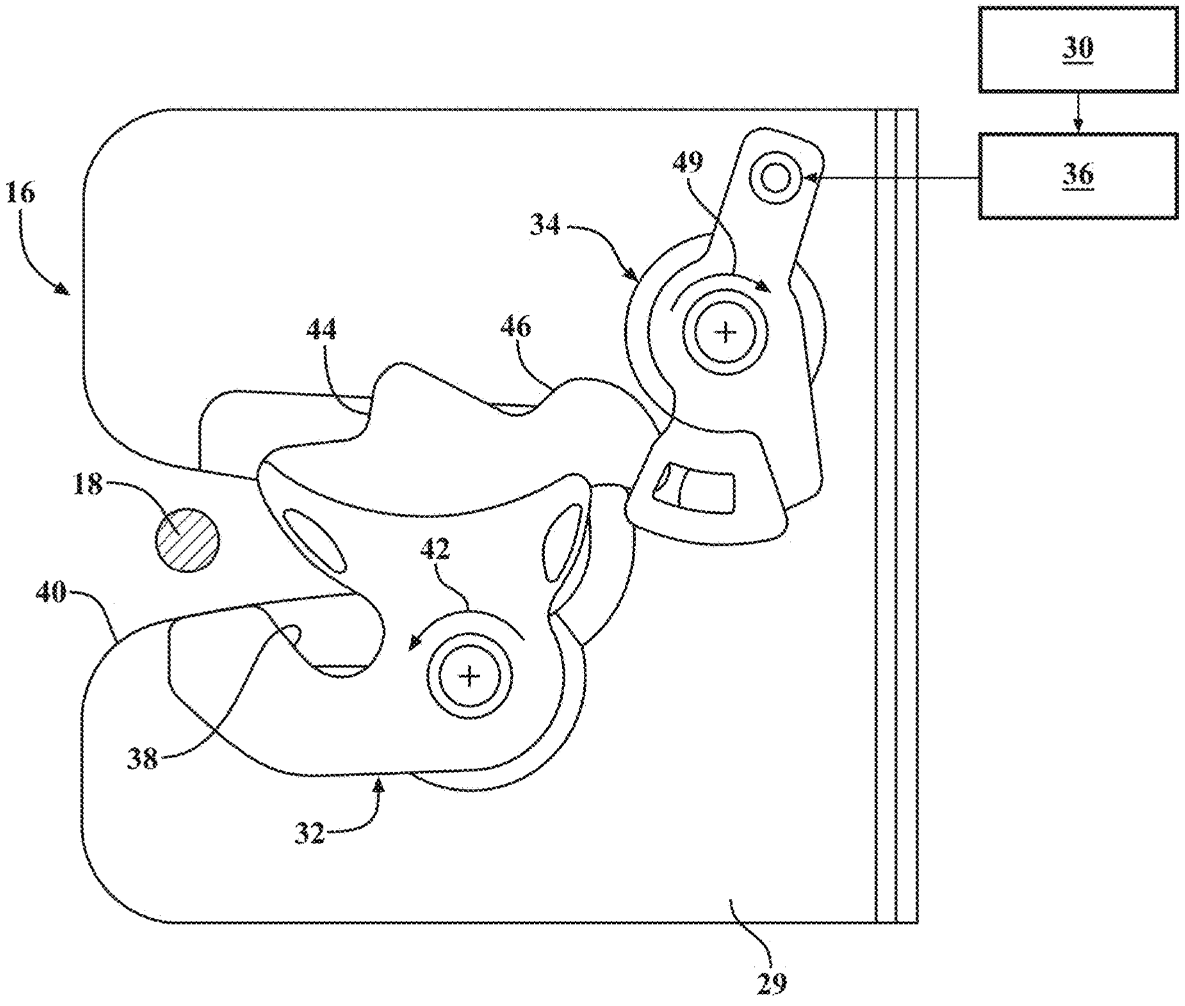
FIG. 2 is a bottom side plan view of a power latch assembly embodying the teachings of the present disclosure shown schematically in operable communication with various components of the side door, with some components removed for clarity purposes only.
Figure 2A:
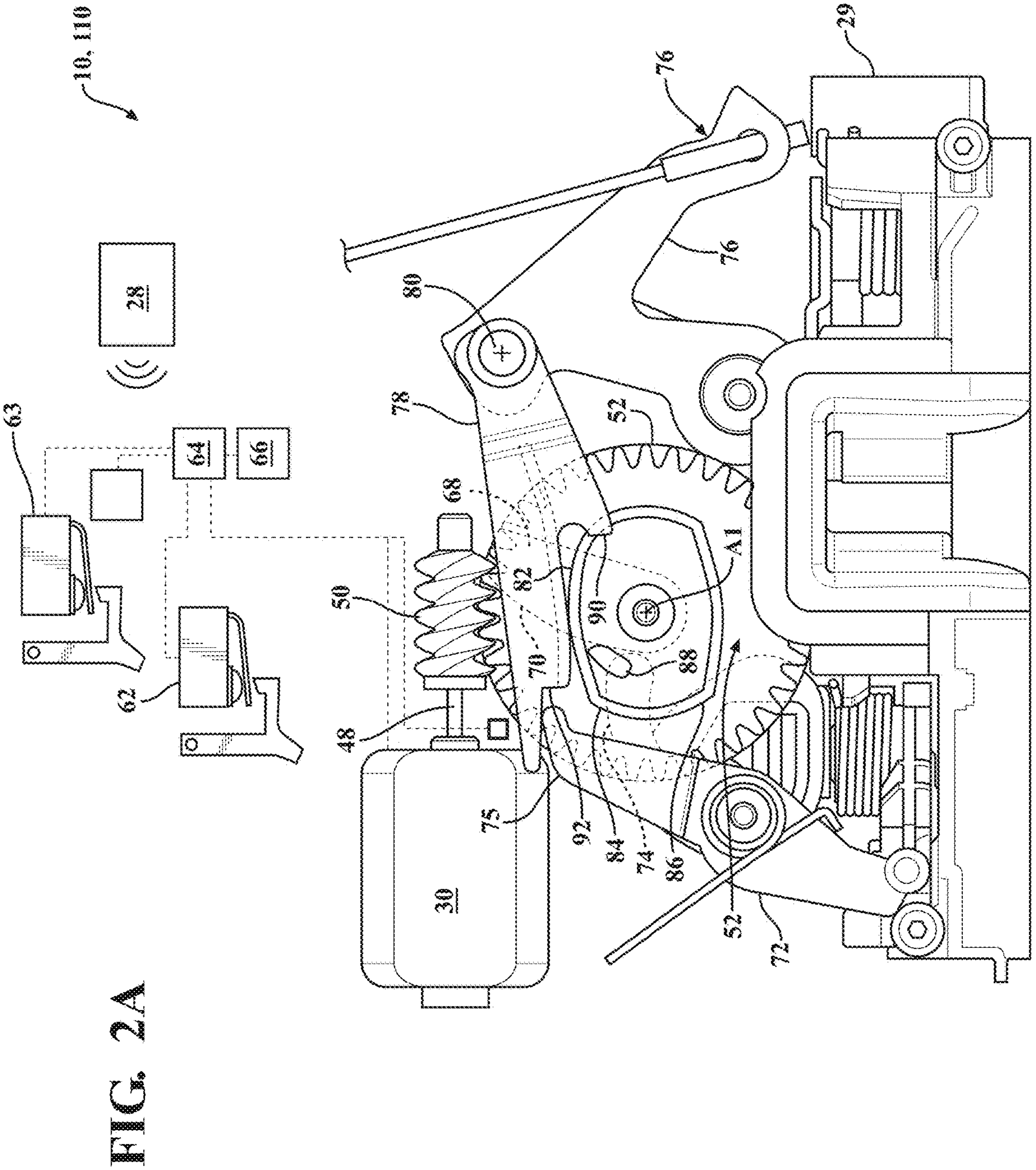
FIG. 2A is a front side elevation view of a power latch assembly embodying the teachings of the present disclosure shown schematically in operable communication with various components of the side door, with some components removed for clarity purposes only.

Referring to FIGS. 2 and 2A, shown is a non-limiting embodiment of latch assembly 10 and latch mechanism 16 (FIG. 2) contained in a housing, shown in part via a latch frame plate 29, with some components removed for clarity purposes. Latch mechanism 16 includes at least one ratchet 32, at least one pawl 34, and a release lever, also referred to as release link, pawl release link, or pawl release lever 36 (shown schematically in FIG. 2 be configured in operable communication with power release actuator 30). Ratchet 32 is movable between a striker capture position, whereat ratchet retains striker 18 with a striker slot 38 of ratchet 32 and swing door 12 in closed position, and a striker release position (FIG. 2), whereat ratchet 32 permits release of striker 18 from striker slot 38 and from a fishmouth 40 provided by latch housing 29 of latch assembly 10 to allow movement of swing door 12 to the open position (FIG. 1). A ratchet biasing member 42, such as a spring, is provided to normally bias ratchet 32 toward its striker release position. Pawl 34 is movable between a ratchet holding position, whereat pawl 34 engages a primary lock surface 44 of ratchet 32 to hold ratchet 32 in its striker capture position, and a ratchet releasing position whereat pawl 34 permits ratchet 32 to move under the bias of ratchet biasing member 42 to its striker release position. Ratchet 32 can further include a secondary lock surface 46 to allow pawl 34 to releasably hold ratchet in a secondary striker capture position, as will be readily understood by a person possessing ordinary skill in the art (POSA) of vehicle latches. A pawl biasing member 49, such as a suitable spring, is provided to normally bias pawl 34 toward its ratchet holding position.

The single power actuator 30 is configured to move the power latch assembly 10 from an unlock state to an open state, whereat the pawl 34 moves from the ratchet holding position to the ratchet releasing position. The power actuator 30 is further configured to perform at least two of the following operations, and in the embodiment illustrated, power actuator 30 performs all the following operations: place the power latch assembly 10 in a child lock state (FIGS. 4 and 4A), whereat the pawl 34 is prevented from moving from the ratchet holding position to the ratchet releasing position regardless of the number of actuations of the inside release mechanism 24; release the power latch assembly 10 from the child lock state; and place the power latch assembly 10 in a lock state (a double pull ON state), shown in FIG. 5, whereat the pawl 34 is prevented from moving from the ratchet holding position to the ratchet releasing position during a first mechanical actuation of the inside release mechanism 24.

Figure 3A:
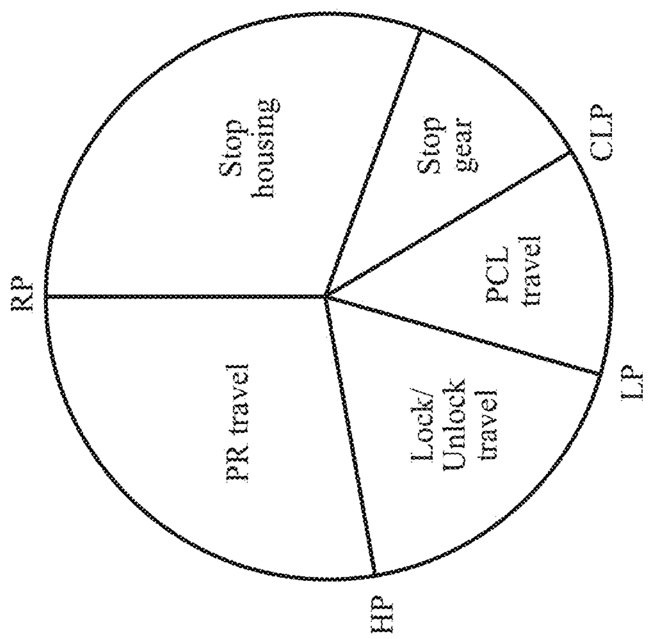
FIG. 3A is schematic diagram illustrating various gear positions of a power release gear of the power latch assembly of FIGS. 2A and 3.
Figure 3:
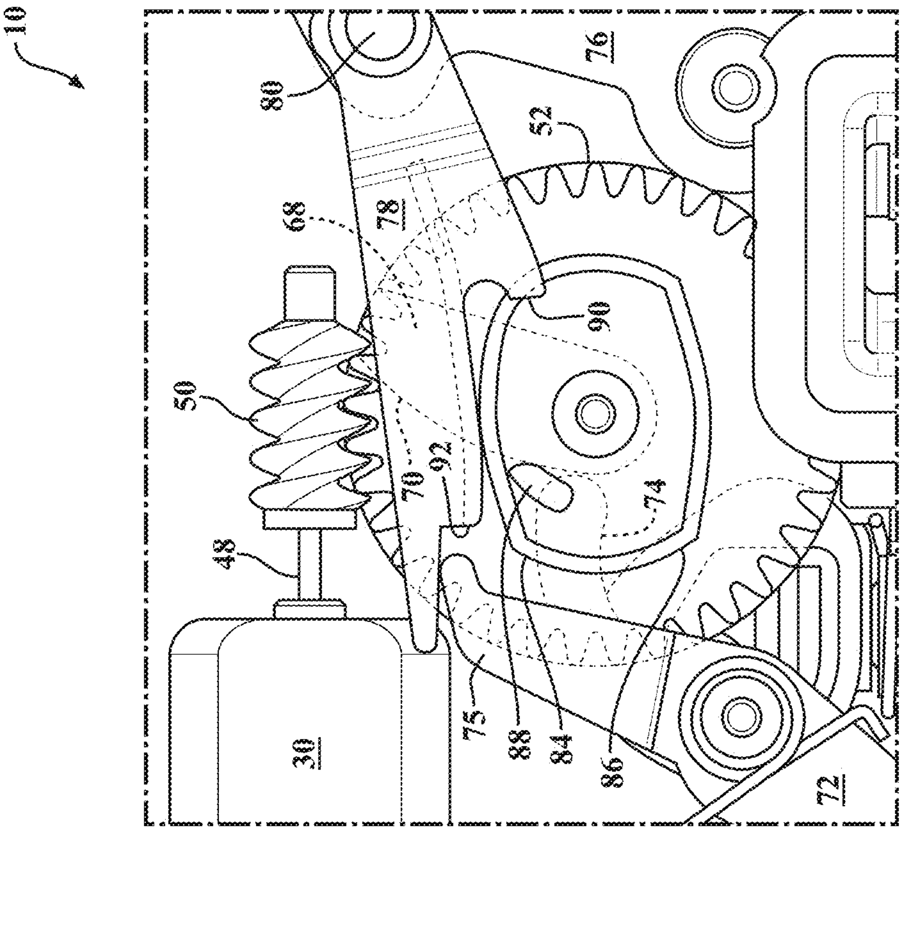
FIG. 3 is a view similar to FIG. 2A illustrating various gear components.

When desired to move pawl 34 from the ratchet holding position to the ratchet releasing position during normal use conditions, such as when a person approaches motor vehicle 14 with electronic key fob 28 (FIG. 2) and actuates the outside door handle 26, for example, sensing both the presence of key fob 28 and that outside door handle 26 has been actuated (e.g. via electronic communication between an electronic switch 62 (FIG. 2, wherein inside door handle 24 also is actuatable via an electronic switch 63) and a latch electronic control unit (ECU) shown at 64 that at least partially controls the operation of latch assembly 10). In turn, latch ECU 64 actuates power release motor 30 to cause a drive gear 50 to be rotatably driven by rotating an output shaft 48 of the power actuator 30 in a first direction, thereby causing a power release gear 52 to be rotatably driven from a home position HP (FIGS. 3A and 9A), to a release position RP (FIGS. 3A and 9B) to release the latch mechanism 16 and shift latch assembly 10 into an unlatched operating state so as to facilitate subsequent opening of vehicle swing door 12. Power release motor 30 can be alternatively activated as part of a proximity sensor based entry feature (radar based proximity detection for example), for example when a person approaches vehicle 14 with electronic key fob 28 (FIG. 2A) and actuates a proximity sensor 66, such as a capacitive sensor, or other touch/touchless based sensor (based on a recognition of the proximity of an object, such as the touch/swipe/hover/gesture or a hand or finger), (e.g. via communication between the proximity sensor 66 and latch ECU 64 that at least partially controls the operation of latch assembly 10). In turn, if detecting a normal use condition, such as the presence of electronic key fob 28, by way of example and without limitation, latch ECU 64 actuates power release motor 30 to rotate the drive gear 50, and thus, power release gear 52 in the first direction to release the latch mechanism 16 and shift latch assembly 10 into an unlatched operating state so as to facilitate subsequent opening of vehicle door 12, as discussed above.

Figure 4:
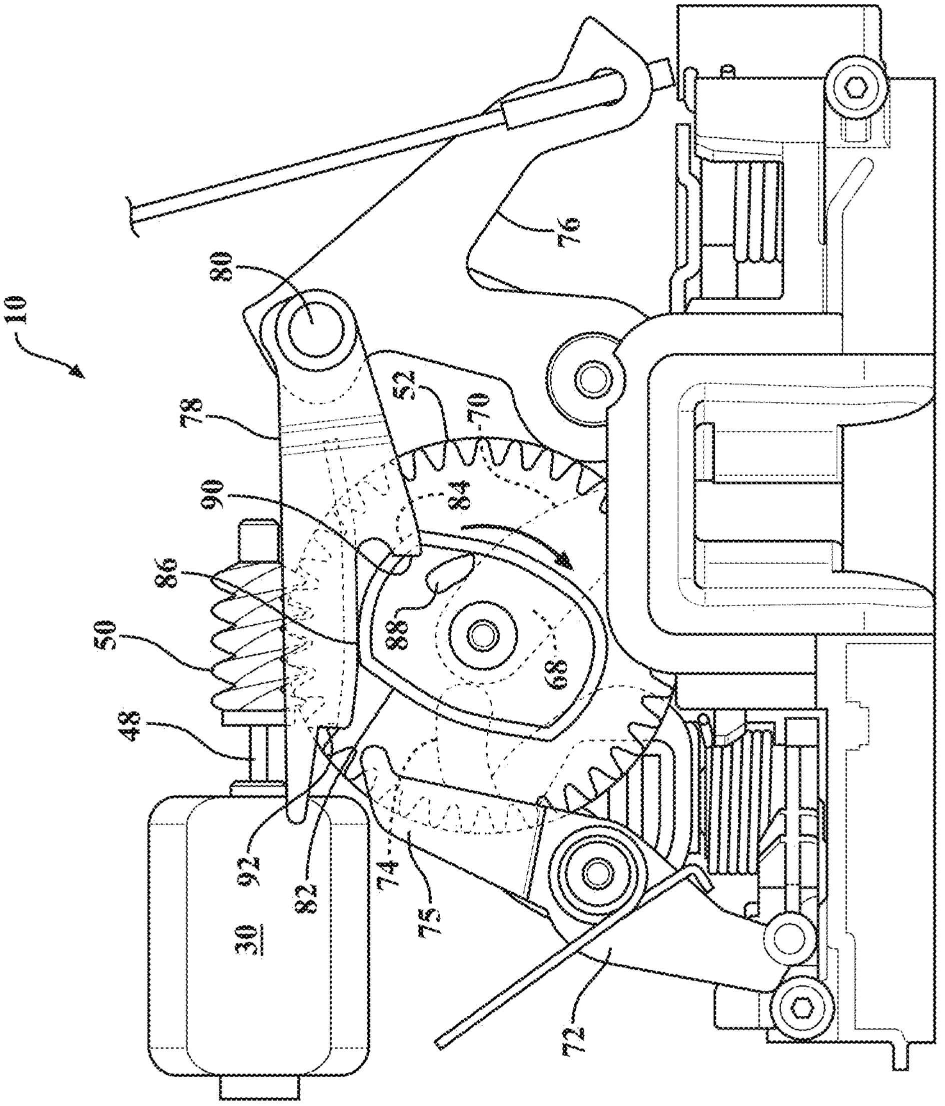
FIG. 4 is a view similar to FIG. 2A illustrating the power latch assembly while in a power child lock ON position.
Figure 5:
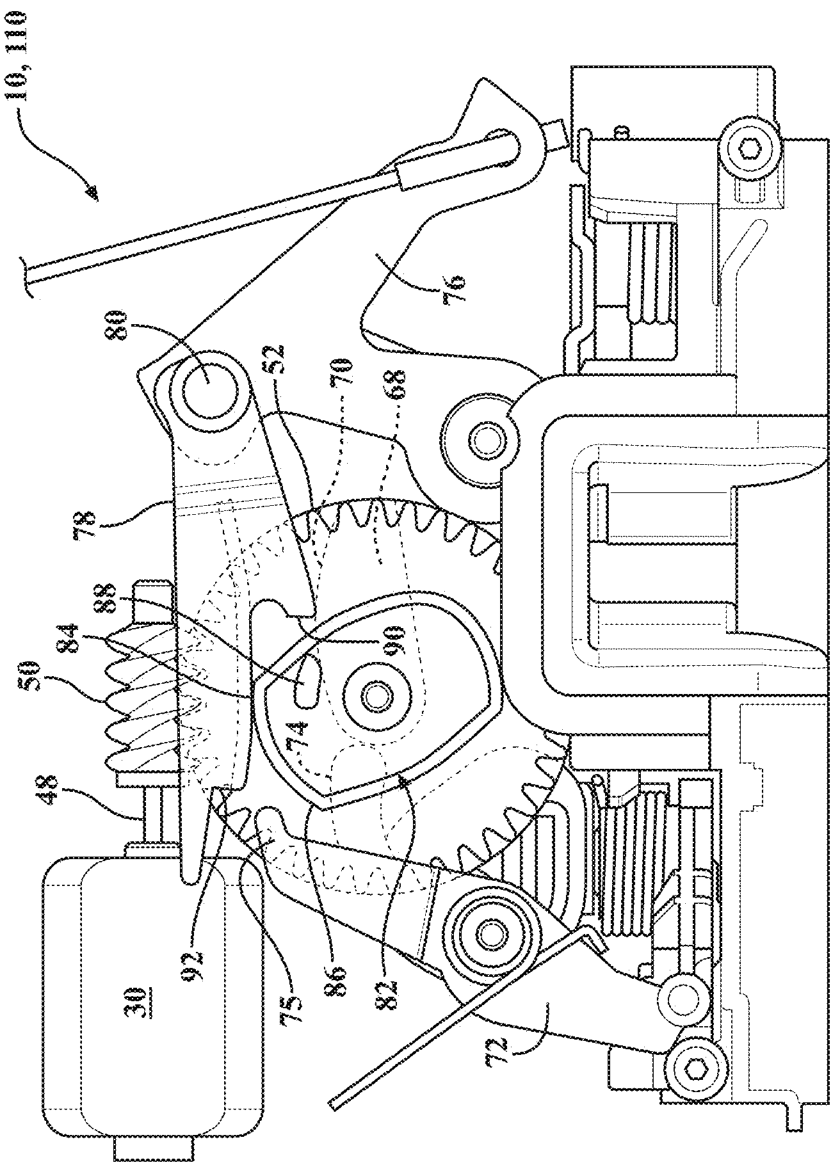
FIG. 5 is a view similar to FIG. 2A illustrating the power latch assembly while in a power child lock OFF position and while in a lock ON position.

As discussed above, the power release gear 52 is configured in operable communication with the power actuator, and in the non-limiting embodiment illustrated, drive gear 50 in configured in meshed engagement with power release gear 52 to cause concurrent rotation between drive gear 50 and power release gear 52. The power actuator 30 is configured to move the power release gear 52 from the home position HP, whereat the power latch assembly 10 is in the unlock state, in a first direction, shown as being counterclockwise in FIG. 9A to the release position RP, whereat the power latch assembly 10 is in the open state. Further, power actuator 30 is configured to drive the power release gear 52 from the home position HP in a second direction, shown as being clockwise in FIG. 4 to a place the power latch assembly 10 in at least one of the child lock state and the lock state, and shown as the child lock state in FIG. 4. It is to be recognized that the power release gear 52 could stop in advance of reaching the child lock position, corresponding to the child lock state of latch assembly 10, wherein the power release gear 52 can be moved to a lock position, corresponding to the lock state of latch assembly 10 (FIG. 5).

Figure 9B:
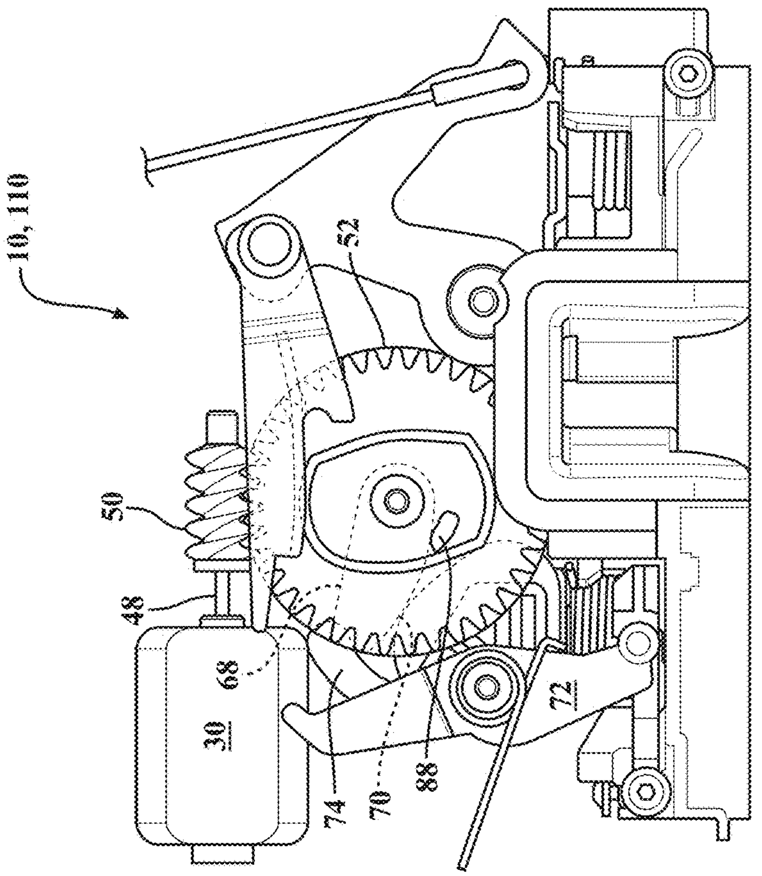
FIGS. 9A and 9B illustrate a sequence of a power release of the power latch assembly via actuation of the single power actuator.
Figure 9A:
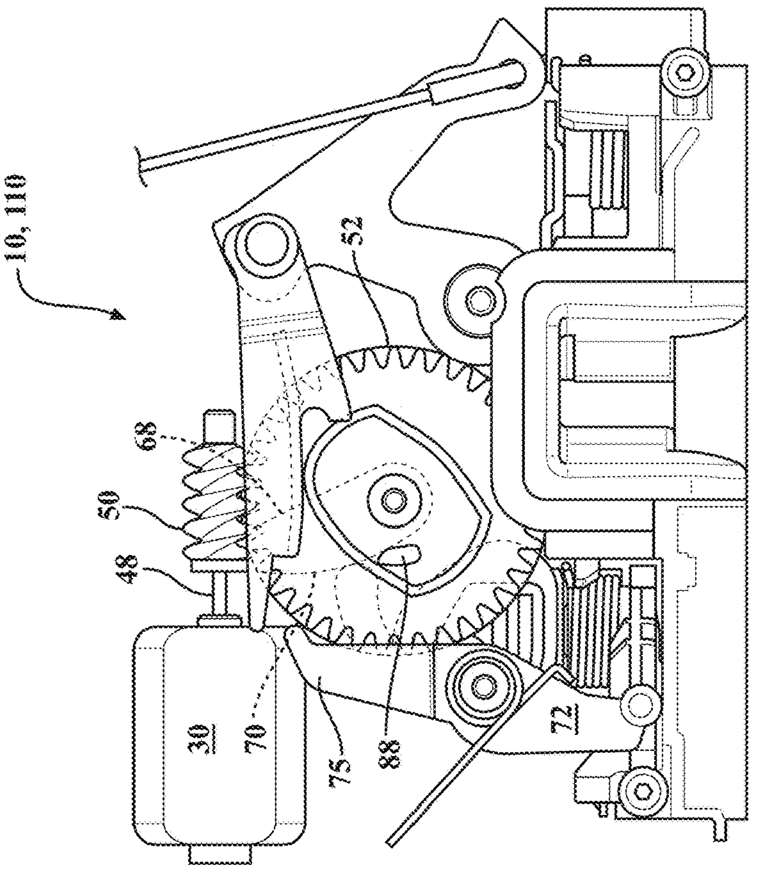

To facilitate moving the power latch assembly 10 to the open state, a first cam 68 extends outwardly from one side of power release gear 52, with first cam 68 having an eccentric outer periphery cam surface 70 relative to a rotational axis A1 of power release gear 52 configured to operably move the pawl 34 from the ratchet holding position to the ratchet releasing position when the power release gear 52 moves in the first direction from the home position HP to the release position RP. As first cam 68 is rotated conjointly with power release gear 52 in the counterclockwise direction from the home position HP, cam surface 70 engages a release lever, also referred to as pawl release lever 72. Pawl release lever 72 is configured for operable communication with the pawl 34, whether directly or indirectly via another lever, to move the pawl 34 from the ratchet holding position to the ratchet releasing position when the pawl release lever 72 is moved from a pawl release lever rest position (FIG. 2A) to a pawl release lever deployed position (FIG. 9B). Pawl release lever 72 can be provided having a first leg 74 configured for engagement with the first cam 68.

Figure 6A:
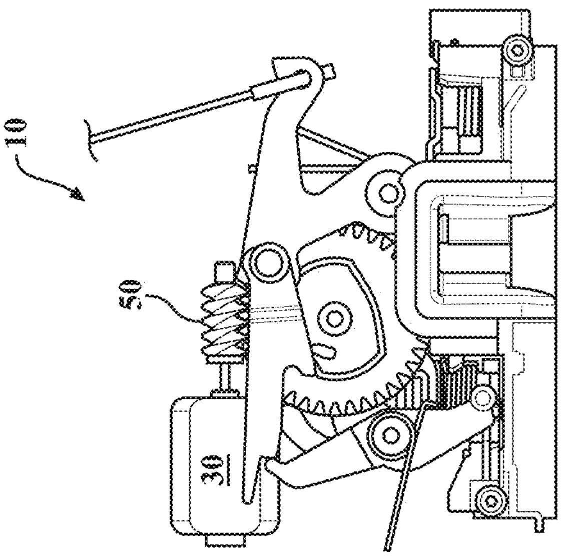
FIG. 6A is a view similar to FIG. 6 with inside release lever mechanically actuated from the inside release lever rest position to the inside release lever deployed position.
Figure 6:
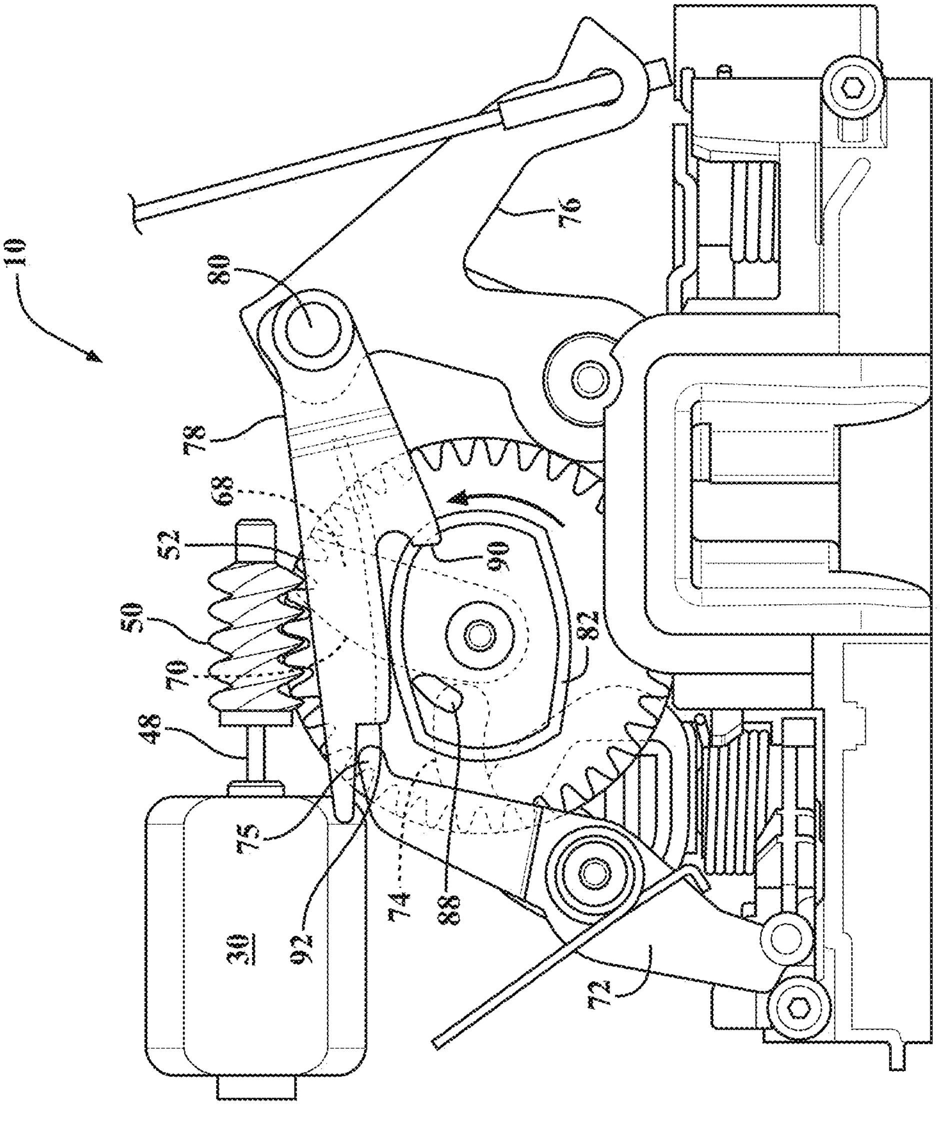
FIG. 6 is a view similar to FIG. 5 illustrating the power release gear being moved to an unlock position via actuation of a single power actuator of the power latch assembly.

The power actuator 30 is shown as being configured to move the power release gear 52 from the home position HP in the second direction to place the power latch assembly the child lock state (FIGS. 4 and 4A) and the lock state (FIG. 5), at separate times. To facilitate manual actuation of the power latch assembly 10, and to further facilitate placing the power latch assembly 10 in one of the lock or child lock states, the power latch assembly 10 includes an inside release lever 76 and a link 78 coupled to one another via a pivot connection 80. The inside release lever 76 is configured for movement from an inside release lever rest position (FIGS. 7A and 8A) (corresponding to a non-actuated position of the handle), to an inside release lever deployed position (FIGS. 7C and 8D) (corresponding to an actuated position of the handle) in response to mechanical actuation of the inside release mechanism 24, whereupon, when the power release gear 52 is in the home position HP, the link 78 moves the power latch assembly 10 from the unlock state to the open state. Accordingly, the link 78 is configured to move the pawl release lever 72 from the pawl release lever rest position to the pawl release lever deployed position when the inside release lever 76 is moved from the inside release lever rest position to the inside release lever deployed position in response to mechanical actuation of the inside release mechanism 24. However, the link 78 is prevented from being able to move the pawl release lever 72 from the pawl release lever rest position to the pawl release lever deployed position when the power latch assembly 10 is in the child lock state. Illustratively, the link 78, pawl release lever 72, and inside release lever 76 connected to a handle (outside or inside handle) form a manual release mechanism adapted to transmit the motion of the handle to the pawl 34 when in an unlocked state e.g. the link 78 is in an aligned condition as illustrated by FIG. 6 and adapted to prevent transmission of the motion of the handle to the pawl 34 when in a locked state e.g. the link 78 is in a bypassed condition as illustrated by FIG. 5. In accordance with another possible configuration, in lieu of a bypassing arrangement, manual release mechanism may be configured as a blocking arrangement. While manual release mechanism is illustrated with reference to components link 78, pawl release lever 72, and inside release lever 76, manual release mechanism may include more or less components forming part of the kinematic release chain between the handle and the pawl having a coupled state where a handle actuation causes the pawl 34 to move, to an uncoupled state where a handle actuation does not cause the pawl 34 to move.

The power release gear 52 has a second cam 82 configured to place the power latch assembly 10 in at least one of the lock state and the child lock state when the power release gear 52 is driven from the home position HP in the second direction (clockwise direction). The second cam 82 is on an opposite side of the power release gear 52 from the first cam 68, thereby reducing the complexity of design and the overall size of the latch assembly 10. In the exemplary embodiment illustrated, the second cam 82 is configured to place the latch assembly 10 in the lock state and the child lock state, at separate times, depending on the command sent to power actuator 30 from latch ECU 64, further reducing the complexity of design and the overall size of the power latch assembly. As such, the second cam 82 has a lock cam surface 84 and a separate child lock cam surface 86 spaced from the lock cam surface 84, such that the respective surface 84, 86 is can be selectively rotated into camming engagement position with link 78.

The lock cam surface 84 of second cam 82 is driven into engagement with link 78 by power release gear 52 when the power actuator 30 is commanded by latch ECU 64 to place latch assembly 10 in the lock state, whereupon power release gear 52 driven from the home position HP to a lock position LP. In contrast, the child lock cam surface 86 of second cam 82 is driven into engagement with link 78 by power release gear 52 when the power actuator 30 is commanded by latch ECU 64 to place latch assembly 10 in the child lock state, whereupon power release gear 52 is driven from the home position HP to a child lock position CLP. Depending on the starting position of power release gear 52, in order to place latch assembly 10 in the lock state, the power actuator 30 is commanded to rotate power release gear 52 in one of the first (counterclockwise) or second (clockwise) direction. For example, if latch assembly 10 is in the unlock state, with power release gear 52 being in its home position HP, and if a command is sent to power actuator 30 via latch ECU 64 to place the latch assembly 10 in the lock state, then power actuator 30 rotates power release gear 52 in the second direction (clockwise) until lock cam surface 84 is moved into engagement with link 78. However, if latch assembly 10 is in the child lock state, with power release gear 52 being in its child lock position CLP, and if a command is sent to power actuator 30 via latch ECU 64 to place the latch assembly 10 in the lock state, then power actuator 30 rotates power release gear 52 in the first direction (counterclockwise) until lock cam surface 84 is moved into engagement with link 78. Accordingly, the power actuator 30 is configured to move the power release gear 52 in the first direction to move the power latch assembly 10 from the child lock state to at least one of the lock state and the unlock state. Thus, it is to be understood that the power actuator 30 is configured to move the power release gear 52 from the child lock position CLP, during a powered first actuation of the power actuator 30, in the first direction (counterclockwise) to move the power latch assembly 10 to the lock state, and to move the power release gear 52 from the lock position LP, during a second powered actuation of the power actuator 30, in the first direction (counterclockwise) to move the power latch assembly 10 from the lock state to the unlock state.

While the latch assembly 10 is in the lock state, the link 78 is prevented from being able to move the pawl release lever 72, and thus, pawl release lever 72 is prevented from being able to be moved via mechanical actuation of inside release mechanism 24 from the pawl release lever rest position to the pawl release lever deployed position when the power latch assembly 10 is in the child lock state.

Figure 4A:
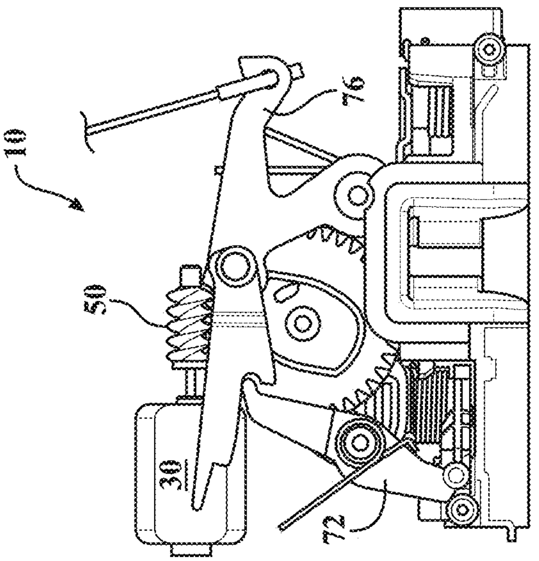
FIG. 4A is a view similar to FIG. 4 illustrating an inside release lever mechanically actuated from an inside release lever rest position to an inside release lever deployed position.
Figure 7A:
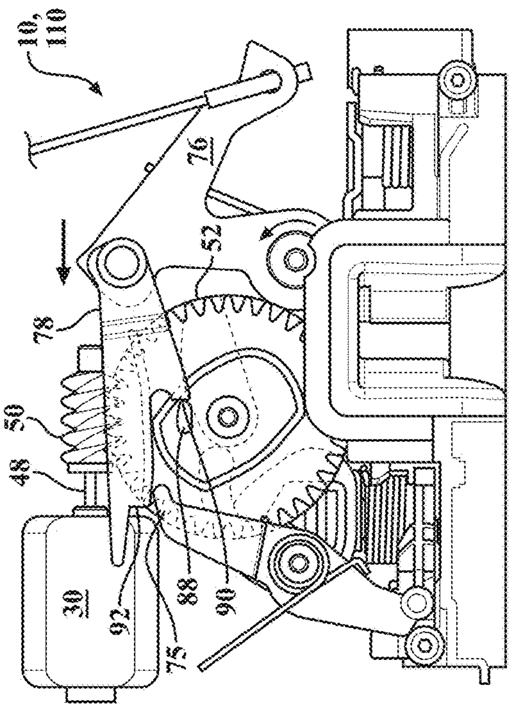
FIGS. 7A-7D illustrate a sequence of a first mechanical actuation of the inside release lever while in the lock ON position.
Figure 7B:
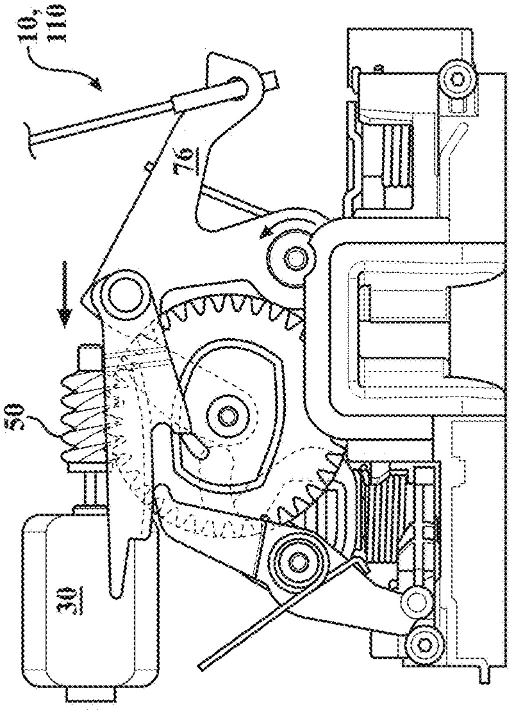
Figure 7C:
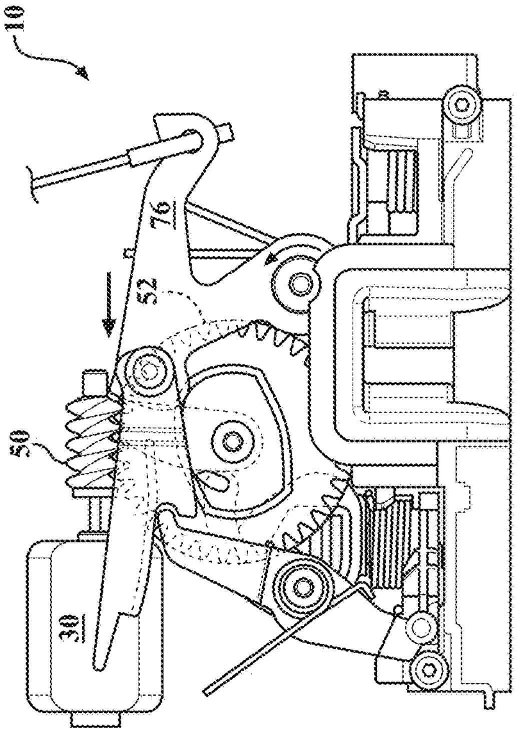
Figure 7D:
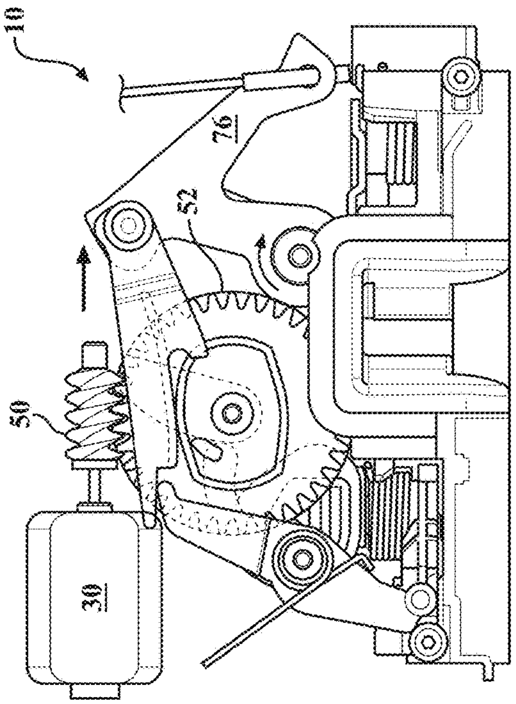
Figure 8A:
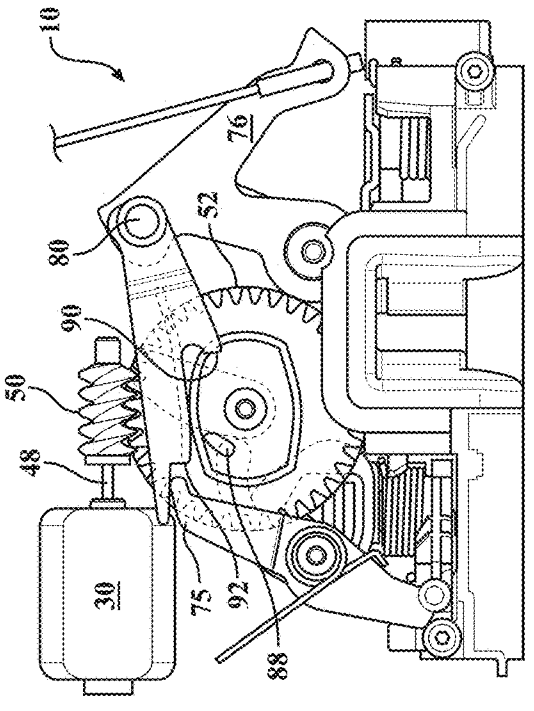
FIGS. 8A-8D illustrate a sequence of a second mechanical actuation, after performing the first mechanical actuation, of the inside release lever while in the lock ON position.
Figure 8B:
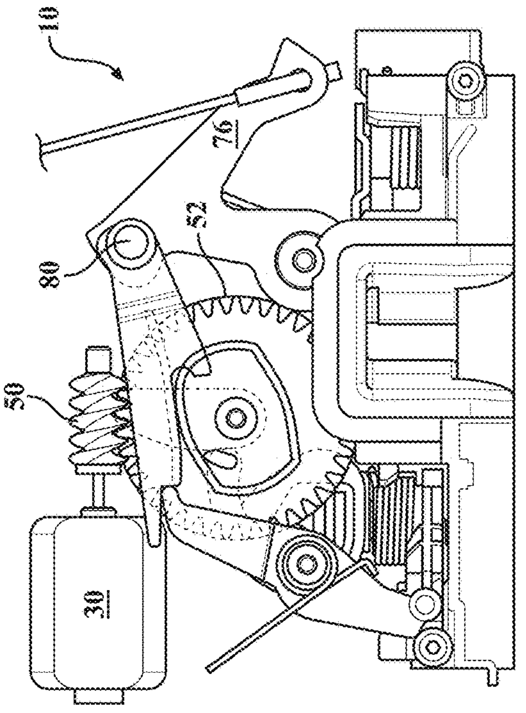
Figure 8C:
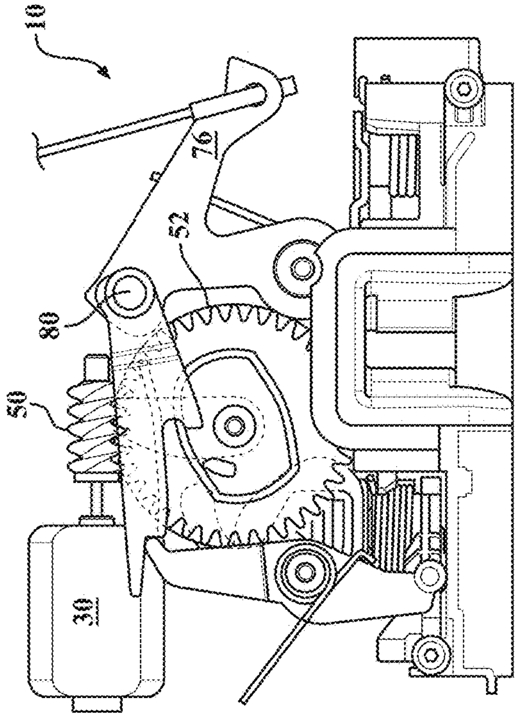
Figure 8D:
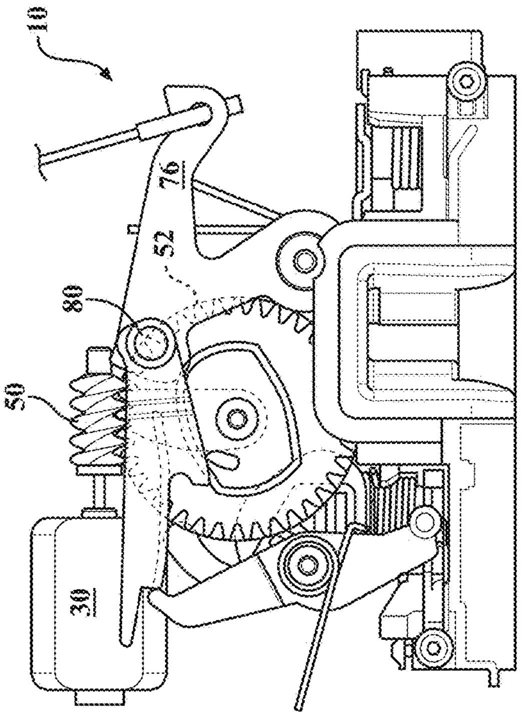

While the latch assembly 10 is in the lock state, with power release gear 52 in its lock position LP, manual actuation of latch assembly 10 is permitted via a double pull actuation of inside release mechanism 24. This is made possible, in part, by the power release gear 52 having an override cam, also referred to as third cam 88. Further assisting the double pull actuation of inside release mechanism 24, the link 78 has a first abutment surface 90 and a second abutment surface 92, wherein the first abutment surface 90 is between the second abutment surface 92 and the pivot connection 80 of the inside release lever 76 and the link 78. The first abutment surface 90 is configured to engage the third cam 88 during movement of the inside release lever 76, via a first mechanical actuation of inside release mechanism 24, from the inside release lever rest position to the inside release lever deployed position while the power latch assembly 10 is in the lock position LP. As such, as shown in FIGS. 7A-7D, when power release gear 52 is in the lock position LP, also referred to as double lock position, a first mechanical actuation of inside release mechanism 24 causes the first abutment surface 90 to engage and drive third cam 88, and power release gear 52 fixed thereto, in the first direction (counterclockwise) until the power release gear 52 is moved from the lock position LP to the unlock, home position HP. Thus with the link 78 in a uncoupled or bypass position, or with the release chain in a double pull ON state as illustratively seen in FIG. 7A-7C the first mechanical actuation of inside release mechanism 24 does not cause actuation of the pawl 34. With the link 78 in a coupled position, or with the release chain in a double pull OFF state as seen in FIG. 7D a subsequent actuation of inside release mechanism 24 may cause actuation of the pawl 34. Then, as shown in FIGS. 8A-8D, a second mechanical actuation of inside release mechanism 24 can be performed, whereupon the second abutment surface 92 of link 78 is configured to engage the pawl release lever 72 to move pawl release lever 72 from the pawl release lever rest position to the pawl release lever deployed position. In the non-limiting embodiment shown, the release lever has a second leg 75 configured for engagement with the second abutment surface 92 of link 78 during the second actuation of inside release mechanism 24. As second abutment surface 92 drives second leg 75 of pawl release lever 72, pawl 34 is caused to move from its ratchet holding position to its ratchet releasing position, whereat ratchet 32 is free to move to the striker release position under the bias of ratchet biasing member 42. As discussed above, while latch assembly 10 is in the child lock state, mechanical actuation of inside release mechanism 24, regardless of the number of times inside release mechanism 24 is actuated, fails to cause power release gear 52 to move from to its release position, and thus, door 12 remains locked. This results due to the third cam 88 being moved out from possible engagement with link 78, and in particular, out from possible engagement with first abutment surface 90, as shown in FIG. 4.

In accordance with another aspect of the disclosure, a method 1000 for configuring a power latch assembly 10 to perform multiple functions with a single power actuator 30 is provided, wherein the power latch assembly 10 has a ratchet 32 configured for movement between a striker capture position and a striker release position, with the ratchet 32 being biased toward the striker release position, and a pawl 34 configured for movement between a ratchet holding position, whereat the pawl 34 maintains the ratchet 32 in the striker capture position, and a ratchet releasing position, whereat the pawl 34 releases the ratchet 32 for movement of the ratchet 32 to the striker release position. The method 1000 includes: a step 1100 of configuring the single power actuator 30 to move the pawl 34 from the ratchet holding position to the ratchet releasing position when the power latch assembly 10 is in a latch closed, unlock state. Further, a step 1150 of configuring the single power actuator 30 to selectively place the power latch assembly 10 in a lock state, whereat upon completion of a first and second mechanical actuation of an inside release mechanism 24, the pawl 34 is moved from the ratchet holding position to the ratchet releasing position. Further yet, a step 1200 of configuring the single power actuator 30 to place the power latch assembly 10 in a child lock state, whereat repeated mechanical actuation of the inside release mechanism 24 fails to move the pawl 34 from the ratchet holding position to the ratchet releasing position.

In accordance with another aspect of the disclosure, the method includes a step 1250 of configuring the single power actuator 30 to drive a power release gear 52 having a first cam 68 configured to move the pawl 34 from the ratchet holding position to the ratchet releasing position when the power release gear 52 is driven from the home position in a first direction to the release position, and configuring the single power actuator 30 to drive the power release gear 52 having a second cam 82 configured to place the power latch assembly 10 in one of the lock state and the child lock state when the power release gear 52 is driven from the home position in a second direction opposite the first direction.

In accordance with another aspect of the disclosure, the method includes a step 1300 of configuring the power release gear 52 to be driven in the first direction to move the power latch assembly 10 from the child lock state to at least one of the lock state and the unlock state.

In accordance with another aspect of the disclosure, the method further includes a step 1350 of coupling an inside release lever 76 and a link 78 to one another via a pivot connection 80 and configuring the inside release lever 76 for movement from an inside release lever rest position to an inside release lever deployed position in response to mechanical actuation of the inside release mechanism 24, whereupon, when the power release gear 52 is in the home position, the link 78 moves the power latch assembly 10 from the unlock state to the open state.

In accordance with another aspect of the disclosure, the method further includes a step 1400 of configuring a pawl release lever 72 for operable communication with the pawl 34 to move the pawl 34 from the ratchet holding position to the ratchet releasing position when the pawl release lever 72 is moved from a pawl release lever rest position to a pawl release lever deployed position, and configuring the link 78 to move the pawl release lever 72 from the pawl release lever rest position to the pawl release lever deployed position when the inside release lever 76 is moved from the inside release lever rest position to the inside release lever deployed position in response to mechanical actuation of the inside release mechanism 24.

In accordance with another aspect of the disclosure, the method further includes a step 1450 of configuring the power release gear 52 having a third cam 88, and configuring the link 78, while the power latch assembly 10 is in the lock state, to engage the third cam 88 during movement of the inside release lever 76 from the inside release lever rest position to the inside release lever deployed position in response to a first mechanical actuation of the inside release mechanism 24 to move the power release gear 52 to the home position, whereat the power latch assembly 10 is in the unlock state, such that a second mechanical actuation of the inside release mechanism 24 causes the pawl release lever 72 to move from the pawl release lever rest position to the pawl release lever deployed position, whereat the power release assembly 10 moves from the unlock state to the open state.

In accordance with yet another aspect of the disclosure, with reference to FIGS. 2A and 5, the latch ECU 64 can be configured to provide instructions to power release actuator 30 to move a power latch assembly 110 from the unlock state to the open state, whereat the pawl 34 moves from the ratchet holding position to the ratchet releasing position, and to place the power latch assembly 110 in the lock state (FIG. 5), or a double pull locked state, whereat the pawl 34 is prevented from moving from the ratchet holding position to the ratchet releasing position during a first mechanical actuation of the inside release mechanism 24, as well as to place the power latch assembly 110 in the child lock state (same as FIG. 5 for the lock state, but maintained/returned to this position as long as in the child lock state, as explained further hereafter), whereat the pawl 34 is prevented from moving from the ratchet holding position to the ratchet releasing position regardless of the number of actuations of the inside release mechanism 24, and release the power latch assembly 110 from the child lock state.

The operation of the power latch assembly 110 while in the unlock state and the lock state are the same as discussed above for power latch assembly 10, and thus, further discussion is believed unnecessary for the power latch assembly 110 while in the unlock and lock states. As such, the discussion hereafter is with particular regard to the power latch assembly 110 while in the child lock state.

Figure 10:
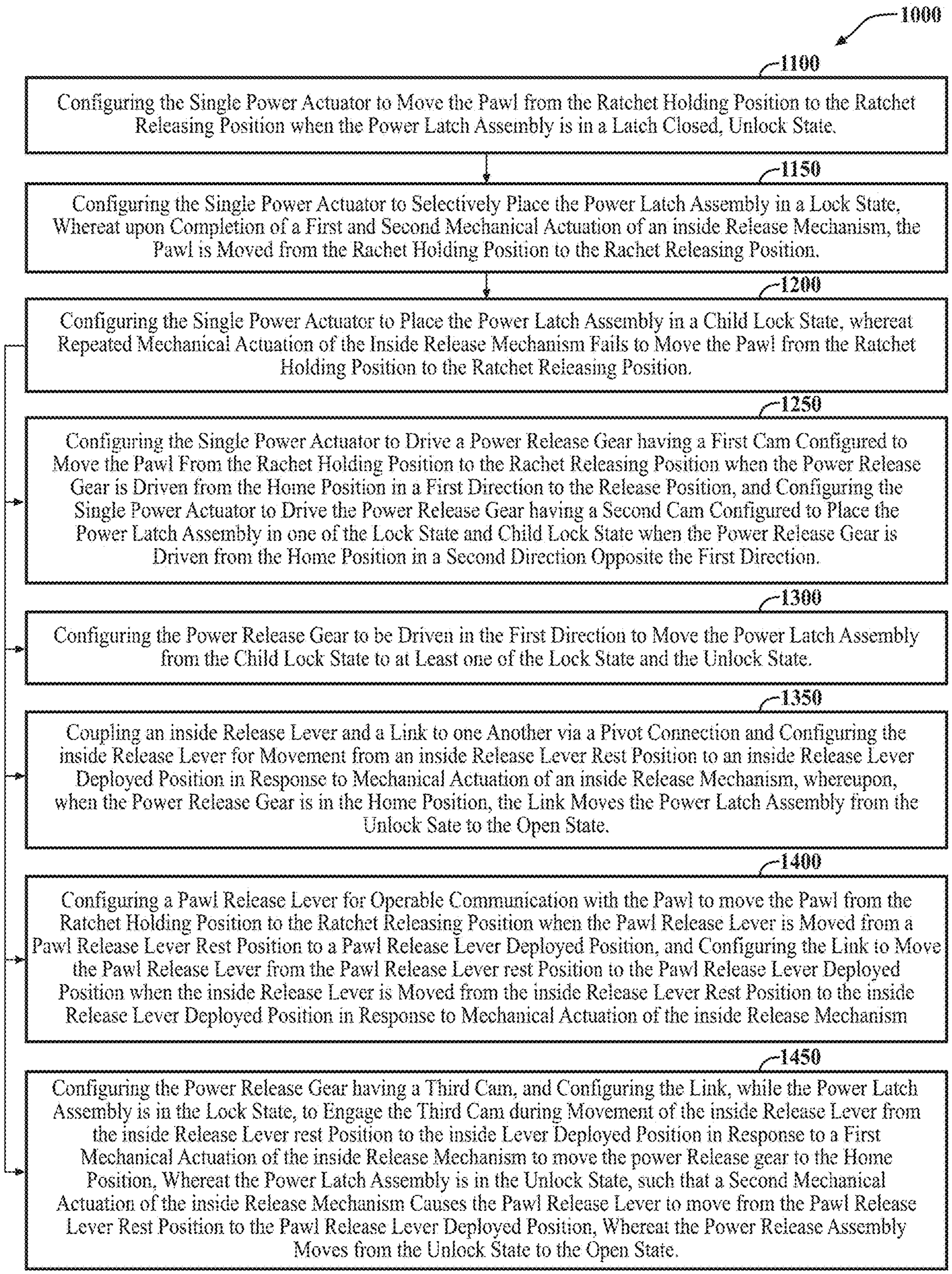
FIG. 10 is a flow diagram illustrating a method for configuring a power latch assembly to perform multiple functions with a single power actuator in accordance with another aspect of the disclosure.

Power latch assembly 110 can be placed in the child lock state via a command to latch ECU 64, such as via a suitable button/switch within or on motor vehicle 14, including on the power latch assembly 110, or via key fob 28, by way of example and without limitation. When placed in the child lock state, power actuator 30 either drives the power release gear 52 from the home position HP in the second direction to a place the power latch assembly 110 in the child lock state (FIG. 5), which coincides with the position of the lock state, or latch ECU 64 changes instructions from those pertaining to the lock state to the child lock state; however, unlike the lock state, as long as power latch assembly 110 remains in the child lock state, upon performing a first pull of inside release lever 76, power release gear 52 is immediately returned to the position illustrated in FIG. 5 via power release actuator 30, and thus, subsequent pulls (movements from non-deployed to deployed positions) of inside release lever 76 do not cause a release of power latch assembly 110 to the open state. Accordingly, movement of power release gear 52 away from the child lock position during a first actuation of inside release lever 76 is the same as illustrated in FIGS. 7A-7B, but then, as inside release lever 76 is released toward or returned to the non-deployed position, power release actuator 30 immediately drives power release gear 52 back in the clockwise direction to the child lock position (FIG. 5). Accordingly, power release gear 52 can be moved to the same position (FIG. 5) by power release actuator 30, and depending on the command from latch ECU 64, can be placed in one of the lock position or the child lock position. Accordingly, two separate states of operation of power latch assembly 110 are available with power release gear 52 being in the same position, i.e. lock and child lock states of power latch assembly 110 corresponding with lock and child lock positions of power release gear 52, depending on the desired state of operation. The locked state illustratively is a double pull locked state, while the child lock state is a modified double pull lock state configured to prevent a second actuation of a handle from releasing the latch. Accordingly, the child lock configuration of latch 10 shown in FIG. 10 having a third gear position whereby first abutment surface 90 is maintained out of alignment with third cam 88 e.g. movement of link 78 due to a handle pull does not cause a rotation of gear 82 may be eliminated resulting in a three position gear 52: (i) Home Position/Unlock Position (FIG. 6), (ii) Power releasing position (FIG. 9B), and (iii) Lock Position (Double Pull On) (FIG. 5), simplifying positioning of the gear 52 at various positions. Therefore, a double pull configuration of the latch 10 may be provided with an additional child lock state through electronic control without the requirement of additional position coordination of the gear 52.

Figure 11:
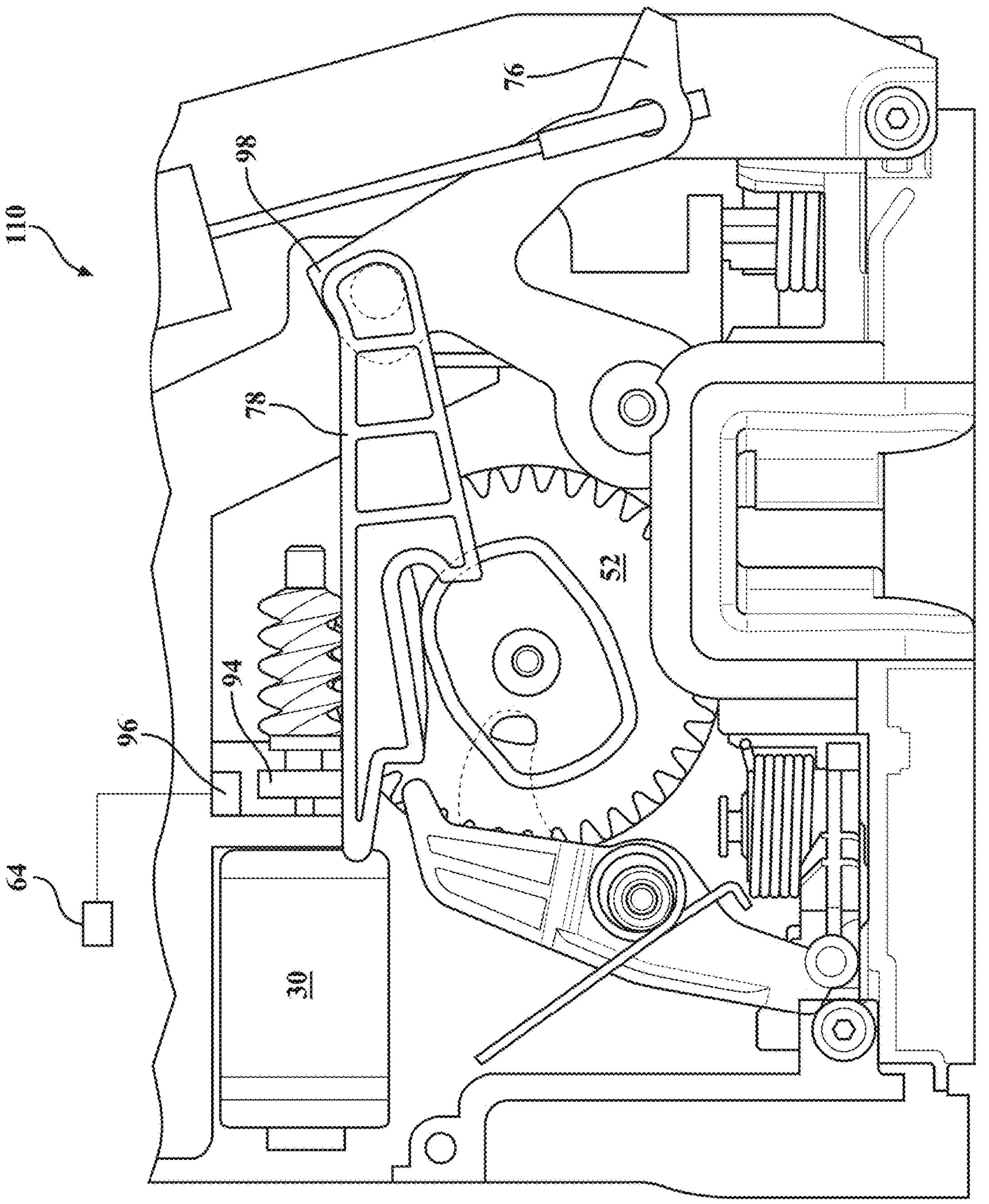
FIG. 11 is a view similar to FIG. 2A of a power latch assembly embodying the teachings of the present disclosure shown schematically in operable communication with various components of the side door, with some components removed for clarity purposes only.
Figure 12:
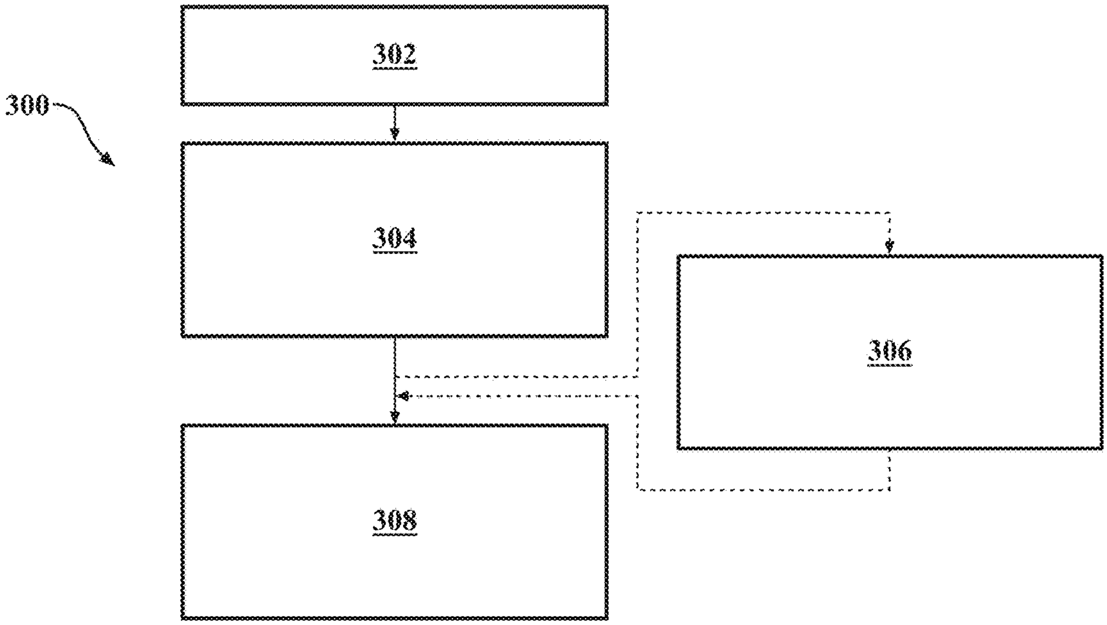
FIG. 12 is a flow diagram illustrating a sequence of detection and operation of a power latch assembly embodying the teachings of the present disclosure to releasably maintain the power latch assembly in a child lock state.

To facilitate timing the movement of the power release gear 52 back to the child lock position (FIGS. 5 and 7A) upon being moved temporarily to the unlock position (FIG. 7B) during a first pull of inside release lever 76, thereby returning power release gear 52 to the child lock position, one or more sensors (FIG. 11) can be provided to detect the position(s) of power release gear 52 and/or link 78. While in the child lock state, with the sensor(s) being configured in operable communication with latch ECU 64, latch ECU 64 can signal power release actuator 30 to drive power release gear 52, as needed, to the place power release gear 52 in the desired position. In an exemplary non-limiting embodiment, a magnet ring 94 can be fixed to output shaft 48 for conjoint rotation therewith, with a first position sensor 96 configured in operable communication with magnet ring 94 to detect the position of power release gear 52. It is to be recognized that as magnet ring 94 rotates in response to actuation of power release actuator 30, first position sensor 96 is able to detect the precise rotational position of power release gear 52, wherein the precision is further facilitated by the gear reduction between drive gear 50 and power release gear 52, such that the precise rotational position of power release gear 52 is communicated to latch ECU 64. Further, a second position sensor 98, whether alone or in combination with first sensor 96, can be incorporated to detect the position of inside release lever 76, with the position of inside release lever 76 being communicated to latch ECU 64. In this manner, latch ECU 64 knows when inside release lever 76 is in the non-deployed position (FIG. 7A) and the deployed position (FIG. 7B). As such, an actuation sequence for returning power release actuator 30 to the child lock position can be established to avoid causing potential stress on power release actuator 30. Stress to the power release actuator 30 could occur if inside release lever 76 is held in the deployed (release) position and power release actuator 30 is actuated to return power release gear 52 in the clockwise direction, whereupon third cam 88 could be brought into forcible engagement against first abutment surface 90 of link 78. As such, it is desired to actuate power release actuator 30 only after inside release lever 76 is free to return to its non-deployed position, thereby avoiding such collision between confronting components. Accordingly, a method of controlling the lock status of a latch assembly 300 as illustrated in FIG. 12, actuation of power release actuator 30 can commence after determining that the power latch assembly 110 is in the child lock state 302 and detecting power release gear 52 has been moved 304, via a first pull actuation of inside release lever 76, from the child lock position (FIGS. 5, 7A) to the unlock position (FIG. 7B) via first position sensor 96. Further, and optionally, in step 306, as part of automatically resetting the latch 10 to the child lock state, actuation of power release actuator 30 can be held off or delayed until detecting the inside release lever 76 is returning or has returned to the non-deployed position via second position sensor 98 (for example, corresponding to the handle returning from the actuated position to the non-actuated position). Then, after confirming that power release gear 52 has been moved to the home position HP via the first actuation of inside release lever 76, and optionally that inside release lever 76 has been returned to its non-deployed position, power release actuator 30 is actuated to rotate clockwise from the home position HP to return to the child lock position CLP in step 308. Actuation of power release actuator 30 could be based on kinematics and/or dimensions of the components of the latch 10, for example actuation of power release actuator 30 could be returned to the child lock position or double pull locked position before the second abutment surface 92 is in alignment with the second leg 75 of pawl release lever 72 during the return stroke of the link 78 to avoid an impatient passenger re-actuating the handle before the handle has fully returned from the actuated position to the non-actuated position. Otherwise, it is contemplated herein that the actuation of power release actuator 30 could be based on a factor of time. As such, to return the power release gear 52 to the child lock position CLP, the power release actuator 30 could be actuated within a predetermined time from the moment the inside release lever 76 is detected as being moved to the deployed position, and/or upon the power release gear 52 being detected as having reached the unlock position. Regardless, the timing is such that a second, or any number of subsequent movements of the inside release lever 76 from the non-deployed position to the deployed position fail to cause the pawl release lever 72 to be moved to release the pawl 34, the power release actuator 30 having returned the latch 10 into the child lock state automatically subsequent to a first actuation of the handle before a second actuation second actuation of a handle, thereby maintaining the power latch assembly 110 in the child lock state. In a possible configuration, the automatic state change from locked to unlock may occur prior to the manual release mechanism returning to a non-actuated state e.g. handle is returned to the non-actuated position. In a possible configuration, the automatic state change from locked to unlock may occur during the manual release mechanism returning to a non-actuated state e.g. while the handle is returned to the non-actuated position, yet before the handle has returned to the non-actuated position.

Figure 13:
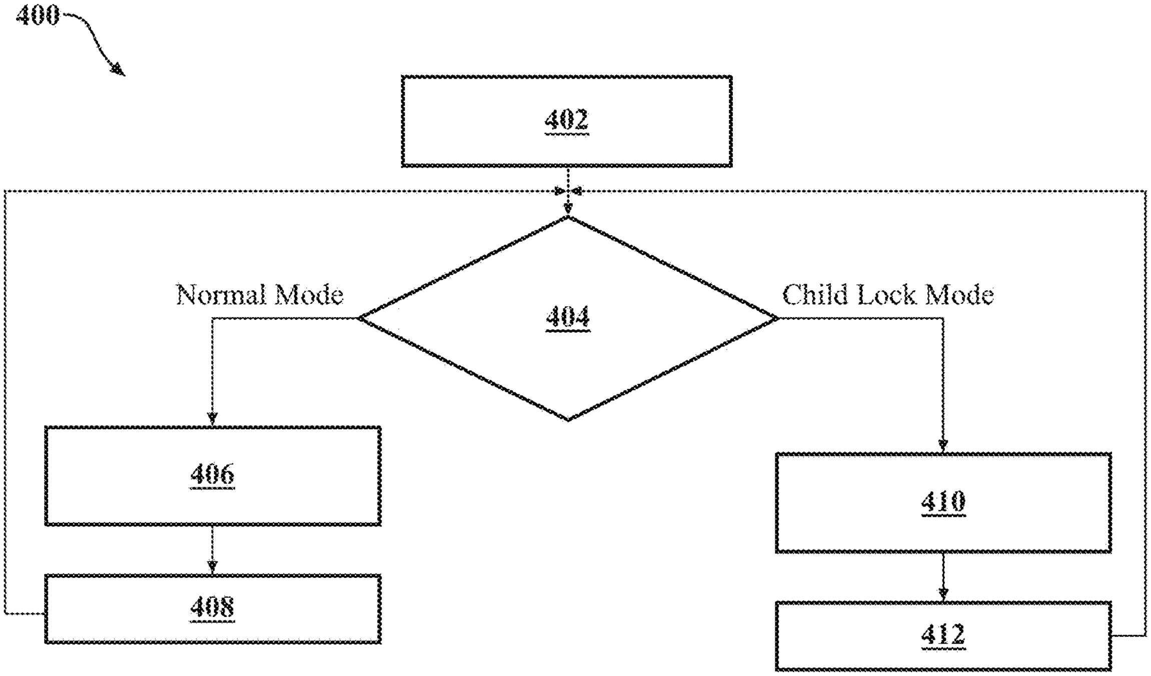
FIG. 13 is a flow diagram illustrating a sequence of detection and operation of a power latch assembly embodying the teachings of the present disclosure depending on whether the power latch assembly is in a non-child lock state or in a child lock state.

In accordance with a further aspect of the disclosure, as illustrated in FIG. 13, a method of controlling the lock status of latch assembly 400 is provided, for example as implemented by a latch ECU 64 which may be configured to monitor an interface between a child lock switch/BCM to determine if power latch assembly 110 is in the child lock position CLP or in a normal mode of operation other than the child lock position 402, such as the lock position LP, double lock position DLP, or unlock position. If latch ECU 64 detects the interface as being in one of the normal position in step 404, and activation of the inside release lever 76 and/or inside handle 24 activation is detected in step 406, power release gear is driven to one of its normal positions discussed above in association with the lock, double lock, or unlock positions in step 408. Otherwise, if the latch ECU 64 detects the interface as being in the child lock position CLP in step 404, and activation of the inside release lever 76 and/or inside handle 24 activation is detected in step 410, power release gear is driven maintained in the child lock position CLP in step 412 regardless of the number of times inside release lever 76 is moved to the deployed position, as discussed above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power latch assembly for a closure panel, comprising:

a ratchet configured for movement between a striker capture position and a striker release position and being biased toward said striker release position;

a pawl configured for movement between a ratchet holding position, whereat said pawl maintains said ratchet in said striker capture position, and a ratchet releasing position, whereat said pawl releases said ratchet for movement of said ratchet to said striker release position; and a power actuator configured to move the power latch assembly from an unlock state to an open state, whereat the pawl moves from a ratchet holding position to a ratchet releasing position, and perform at least two of the following: place the power latch assembly in a child lock state, whereat the pawl is prevented from moving from the ratchet holding position to the ratchet releasing position; release the power latch assembly from the child lock state; place the power latch assembly in a lock state, whereat the pawl is prevented from moving from the ratchet holding position to the ratchet releasing position during a first mechanical actuation of an inside release mechanism; and release the power latch assembly from the lock state;

further including a power release gear configured in operable communication with said power actuator, said power actuator being configured to move said power release gear from a home position, whereat said power latch assembly is in the unlock state, in a first direction to a release position, whereat said power latch assembly is in the open state, and to drive said power release gear from the home position in a second direction to place the power latch assembly in at least one of the child lock state and the lock state; and wherein said power release gear includes a first cam configured to move the pawl from the ratchet holding position to the ratchet releasing position when the power release gear moves in the first direction from the home position to the release position, and a second cam configured to place the power latch assembly in at least one of the lock state and the child lock state when the power release gear is driven from the home position in the second direction.

2. The power latch assembly of claim 1, wherein said power actuator is configured to move said power release gear from the home position in the second direction to place the power latch assembly in the child lock state and the lock state, at separate times.

3. The power latch assembly of claim 2, wherein said power actuator is configured to move said power release gear in the first direction to move the power latch assembly from the child lock state to at least one of the lock state and the unlock state.

4. The power latch assembly of claim 3, wherein said power actuator is configured to move said power release gear, during a first actuation of said power actuator, in the first direction to move the power latch assembly from the child lock state to the lock state, and during a second actuation of said power actuator, in the first direction to move the power latch assembly from the lock state to the unlock state.

5. The power latch assembly of claim 1, wherein the first cam and the second cam are on opposite sides of the power release gear.

6. The power latch assembly of claim 1, wherein the second cam is configured to place the power latch assembly in the lock state and the child lock state, at separate times.

7. The power latch assembly of claim 1, further including an inside release lever and a link coupled to one another via a pivot connection, said inside release lever being configured for movement from an inside release lever rest position to an inside release lever deployed position in response to mechanical actuation of an inside release mechanism, whereupon, when said power release gear is in the home position, said link moves said power latch assembly from the unlock state to the open state.

8. The power latch assembly of claim 7, further including a pawl release lever configured for operable communication with said pawl to move said pawl from the ratchet holding position to the ratchet releasing position when the pawl release lever is moved from a pawl release lever rest position to a pawl release lever deployed position, said link being configured to move said pawl release lever from the pawl release lever rest position to the pawl release lever deployed position when said inside release lever is moved from the inside release lever rest position to the inside release lever deployed position in response to mechanical actuation of the inside release mechanism.

9. The power latch assembly of claim 8, wherein said link is prevented from being able to move said pawl release lever from the pawl release lever rest position to the pawl release lever deployed position when the power latch assembly is in the child lock state.

10. The power latch assembly of claim 9, wherein said power release gear includes a third cam, said link, while said power latch assembly is in the lock state, being configured to engage said third cam during movement of said inside release lever from the inside release lever rest position to the inside release lever deployed position in response to a first mechanical actuation of the inside release mechanism to move said power release gear to the home position, whereat said power latch assembly is in the unlock state, such that a second mechanical actuation of the inside release mechanism causes said pawl release lever to move from the pawl release lever rest position to the pawl release lever deployed position, whereat said power latch assembly moves from the unlock state to the open state.

11. The power latch assembly of claim 10, wherein the link has a first abutment surface and a second abutment surface, said first abutment surface being configured to engage said third cam during movement of said inside release lever from the inside release lever rest position to the inside release lever deployed position while said power latch assembly is in the lock position, and said second abutment surface being configured to engage said pawl release lever to move from the pawl release lever rest position to the pawl release lever deployed position while said power latch assembly is in the unlock position.

12. The power latch assembly of claim 11, wherein said first abutment surface is between said second abutment surface and the pivot connection.

13. The power latch assembly of claim 8, wherein said pawl release lever has a first leg configured for engagement with said first cam and a second leg configured for engagement with said link.

14. A power latch assembly for a closure panel, comprising:

a ratchet configured for movement between a striker capture position and a striker release position and being biased toward said striker release position;

a pawl configured for movement between a ratchet holding position, whereat said pawl maintains said ratchet in said striker capture position, and a ratchet releasing position, whereat said pawl releases said ratchet for movement of said ratchet to said striker release position;

a power actuator configured to move the power latch assembly from an unlock state to an open state, whereat the pawl moves from a ratchet holding position to a ratchet releasing position, and perform at least two of the following: place the power latch assembly in a child lock state, whereat the pawl is prevented from moving from the ratchet holding position to the ratchet releasing position; release the power latch assembly from the child lock state; place the power latch assembly in a lock state, whereat the pawl is prevented from moving from the ratchet holding position to the ratchet releasing position during a first mechanical actuation of an inside release mechanism; and release the power latch assembly from the lock state; and a power release gear configured in operable communication with said power actuator, said power actuator being configured to move said power release gear from a home position, whereat said power latch assembly is in the unlock state, in a first direction to a release position, whereat said power latch assembly is in the open state, and to drive said power release gear from the home position in a second direction to place the power latch assembly in the child lock state and the lock state, whereat the power release gear is in the same position while in the child lock state and the lock state.

15. The power latch assembly of claim 14, further including an inside release lever and a link coupled to one another via a pivot connection, said inside release lever being configured for movement from an inside release lever rest position to an inside release lever deployed position in response to mechanical actuation of an inside release mechanism, whereupon, when said power release gear is in the home position, said link moves said power latch assembly from the unlock state to the open state in response to the inside release lever being moved from the inside release lever rest position to the inside release lever deployed position, and when said power release gear is in the lock position, said link moves said power release gear from the lock position to the home position, whereat said power latch assembly is in the unlock state, in response to the inside release lever being moved from the inside release lever rest position to the inside release lever deployed position in a first pull, and moves said power latch assembly from the unlock state to the open state in response to the inside release lever being moved from the inside release lever rest position to the inside release lever deployed position in a second pull, and when said power release gear is in the child lock position, said link moves said power release gear from the child lock position to the home position in response to said inside release lever being moved from the inside release lever rest position to the inside release lever deployed position, whereupon said power actuator drives said power release gear back from the home position in the second direction to the child lock position.

16. A power latch assembly for a closure panel, the power latch assembly operably coupled to a handle, the power latch assembly comprising:

a ratchet configured for movement between a striker capture position and a striker release position and being biased toward said striker release position;

a pawl configured for movement between a ratchet holding position, whereat said pawl maintains said ratchet in said striker capture position, and a ratchet releasing position, whereat said pawl releases said ratchet for movement of said ratchet to said striker release position;

a double pull mechanism having a double pull on state and a double pull off state, wherein a first actuation of the handle with the double pull mechanism in the double pull on state transitions the double pull mechanism from the double pull on state to the double pull off state and prevents the handle from moving the pawl, and a second actuation of the handle with the double pull mechanism in the double pull off state causes the pawl to be moved to the ratchet releasing position; and a single motor for rotating a power release gear adapted to move the pawl to the ratchet releasing position and to transition the double pull mechanism from the double pull off state to the double pull on state subsequent the first actuation, wherein the power release gear is back driven in response to the first actuation of the handle.

17. The power latch assembly of claim 16, wherein the motor is adapted to transition the double pull mechanism from the double pull off state to the double pull on state subsequent the first actuation during the return of the handle to an unactuated position from and an actuated position.

18. A method of configuring a power latch assembly to perform multiple functions with a single power actuator configured to drive a power release gear, the power latch assembly having a ratchet configured for movement between a striker capture position and a striker release position and being biased toward the striker release position, and a pawl configured for movement between a ratchet holding position, whereat the pawl maintains the ratchet in the striker capture position, and a ratchet releasing position, whereat the pawl releases the ratchet for movement of the ratchet to the striker release position, comprising:

configuring the single power actuator to drive the power release gear to move the pawl from the ratchet holding position to the ratchet releasing position when the power latch assembly is in a latch closed, unlock position;

configuring the single power actuator to drive the power release gear to selectively place the power latch assembly in a lock state, whereat upon completion of a first mechanical actuation of an inside release mechanism, the power release gear is backdriven and upon a second mechanical actuation of an inside release mechanism, the pawl is moved from the ratchet holding position to the ratchet releasing position; and configuring the single power actuator to drive the power release gear to place the power latch assembly in a child lock state, whereat repeated mechanical actuation of the inside release mechanism fails to move the pawl from the ratchet holding position to the ratchet releasing position.

19. The power latch assembly of claim 16, wherein said power release gear includes a first cam configured to move the pawl from the ratchet holding position to the ratchet releasing position, and a second cam configured to place the power latch assembly in the double pull on state.

20. The method of claim 18, further including providing the power release gear having a first cam configured to move the pawl from the ratchet holding position to the ratchet releasing position, and a second cam configured to place the power latch assembly in at least one of the lock state and the child lock state.

* * * * *